(12) United States Patent
Kotake et al.

(10) Patent No.: US 11,905,452 B2
(45) Date of Patent: Feb. 20, 2024

(54) TREATMENT AGENT FOR TREATING FIBERS, FIBERS AND PRODUCTION METHOD THEREFOR, AND FIBER SHEET AND PRODUCTION METHOD THEREFOR

(71) Applicant: HITACHI CHEMICAL COMPANY, LTD., Tokyo (JP)

(72) Inventors: Tomohiko Kotake, Tokyo (JP); Tatsuya Makino, Tokyo (JP); Kouta Iwanaga, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 1044 days.

(21) Appl. No.: 16/482,323

(22) PCT Filed: Feb. 1, 2018

(86) PCT No.: PCT/JP2018/003465
§ 371 (c)(1),
(2) Date: Jul. 31, 2019

(87) PCT Pub. No.: WO2018/143364
PCT Pub. Date: Aug. 9, 2018

(65) Prior Publication Data
US 2019/0359869 A1    Nov. 28, 2019

(30) Foreign Application Priority Data

Feb. 2, 2017 (WO) .................. PCT/JP2017/003864

(51) Int. Cl.
*C08L 83/04* (2006.01)
*C09K 3/18* (2006.01)
*D06M 15/643* (2006.01)

(52) U.S. Cl.
CPC .............. *C09K 3/18* (2013.01); *C08L 83/04* (2013.01); *D06M 15/643* (2013.01); *C08L 2203/12* (2013.01); *C08L 2205/025* (2013.01); *D06M 2200/12* (2013.01)

(58) Field of Classification Search
USPC .................................................. 106/287.14
See application file for complete search history.

(56) References Cited

U.S. PATENT DOCUMENTS

| | | | | |
|---|---|---|---|---|
| 3,629,228 A * | 12/1971 | Hartlein | ................ | C08G 77/44 528/901 |
| 4,234,441 A * | 11/1980 | Scott | ................ | C08K 5/54 252/78.3 |
| 4,258,102 A * | 3/1981 | Traver | ................ | D21H 19/62 524/588 |
| 4,617,057 A * | 10/1986 | Plueddemann | ..... | D06M 15/263 106/2 |
| 5,763,505 A * | 6/1998 | Derian | ................ | C08J 3/03 524/588 |
| 2015/0175863 A1* | 6/2015 | Baily | .................. | C09K 3/1018 524/425 |
| 2017/0283269 A1* | 10/2017 | Kotake | ................ | C01B 33/158 |

FOREIGN PATENT DOCUMENTS

| | | | |
|---|---|---|---|
| EP | 902 067 | * | 3/1999 |
| EP | 2963325 A | | 1/2016 |
| EP | 3112405 A | | 1/2017 |
| JP | H4-371651 A | | 12/1992 |
| JP | H7-048559 A | | 2/1995 |
| JP | H7-258549 A | | 10/1995 |
| JP | H7-305053 A | | 11/1995 |
| JP | 2000-026609 A | | 1/2000 |
| JP | 2000-104047 A | | 4/2000 |
| JP | 2001-146627 A | | 5/2001 |
| JP | 2006-200083 A | | 8/2006 |
| JP | 2007-177232 A | | 7/2007 |
| JP | 2010-235931 A | | 10/2010 |
| JP | 2011-026402 A | | 2/2011 |
| JP | 2012-233110 A | | 11/2012 |
| KR | 10-2013-0082217 A | | 7/2013 |
| WO | 2015/129736 A1 | | 9/2015 |
| WO | 2016/047740 A1 | | 3/2016 |
| WO | 2017/010551 A1 | | 1/2017 |

* cited by examiner

*Primary Examiner* — Margaret G Moore
(74) *Attorney, Agent, or Firm* — FITCH, EVEN, TABIN & FLANNERY, LLP

(57) ABSTRACT

The present invention relates to a treatment agent for treating fibers, the treatment agent comprising a condensation product of a liquid composition comprising at least one selected from the group consisting of a polysiloxane compound having a hydrolyzable functional group or a condensable functional group and a hydrolyzate of the polysiloxane compound having a hydrolyzable functional group.

4 Claims, 5 Drawing Sheets

TREATMENT AGENT FOR TREATING FIBERS, FIBERS AND PRODUCTION METHOD THEREFOR, AND FIBER SHEET AND PRODUCTION METHOD THEREFOR

CROSS-REFERENCE TO RELATED APPLICATIONS

This application is a U.S. national phase application filed under 35 U.S.C. § 371 of International Application No. PCT/JP2018/003465, filed Feb. 1, 2018, designating the United States, which claims priority from International Application No. PCT/JP2017/003864, filed Feb. 2, 2017, designating the United States, which are hereby incorporated herein by reference in their entirety.

TECHNICAL FIELD

The present invention relates to a treatment agent for treating fibers, fibers and a production method therefor, and a fiber sheet and a production method therefor.

BACKGROUND ART

As a technique for water-repellent finishing or oil-repellent finishing of fibers, for example, there is generally known a method of coating the fibers with a solution, an emulsion, a dispersion or the like obtained by dissolving or dispersing a water-repellent compound in a solvent or water, and then vaporizing the solvent, water, and the like to form a water-repellent continuous film.

Further, Patent Literature 1 discloses a method in which water-repellent particles are contained in fibers by adding and mixing water-repellent particles to a stock solution for spinning.

CITATION LIST

Patent Literature

Patent Literature 1: Japanese Unexamined Patent Publication

SUMMARY OF INVENTION

Technical Problem

However, the treatment agent used to impart water-repelling performance to the fibers is required to be excellent in water repellency. Further, it is considered preferable for such a treatment agent to be capable of imparting, for example, thermal insulation properties in addition to water repellency.

The present invention has been made in view of the above-described circumstances, and an object thereof is to provide a treatment agent for treating fibers which can impart excellent water repellency and thermal insulation properties to fibers. Another object of the present invention is to provide a fiber production method and a fiber sheet production method using the above-mentioned treatment agent, and a fiber and a fiber sheet obtained by using the above-mentioned treatment agent.

Solution to Problem

As a result of intensive studies to achieve the above object, the present inventors discovered a treatment agent obtained by using a liquid composition comprising a polysiloxane compound having a reactive group (hydrolyzable functional group or condensable functional group) in the molecule exhibits excellent water repellency and thermal insulation properties, based on which the present invention has been completed.

The present invention provides a treatment agent for treating fibers, the treatment agent comprising a condensation product of a liquid composition comprising at least one selected from the group consisting of a polysiloxane compound having a hydrolyzable functional group or a condensable functional group and a hydrolyzate of the polysiloxane compound having a hydrolyzable functional group. Further, the present invention provides a treatment agent for treating fibers, the treatment agent comprising a liquid composition comprising at least one selected from the group consisting of a polysiloxane compound having a hydrolyzable functional group or a condensable functional group and a hydrolyzate of the polysiloxane compound having a hydrolyzable functional group. According to such treatment agents, excellent water repellency and thermal insulation properties can be imparted to a fiber.

In the above-mentioned treatment agent, the liquid composition may further comprise silica particles. Such a treatment agent further improves water repellency and thermal insulation properties.

The number of silanol groups per g of the silica particles may be $10 \times 10^{18}$ to $1000 \times 10^{18}$ groups/g. This enables the treatment to be conducted at low temperature and in a short time, and also further improves water repellency. As a result, the adhesiveness between the treatment agent and the fiber is improved.

When the condensable functional group is a hydroxyalkyl group, examples of the polysiloxane compound include a compound represented by the following formula (A). This enables even better water repellency and adhesiveness to be achieved.

[Chemical Formula 1]

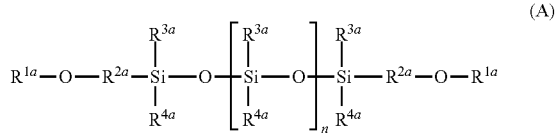

[wherein $R^{1a}$ represents a hydroxyalkyl group, $R^{2a}$ represents an alkylene group, $R^{1a}$ and $R^{4a}$ each independently represent an alkyl group or an aryl group, and n represents an integer of 1 to 50.]

When the hydrolyzable functional group is an alkoxy group, examples of the polysiloxane compound include a compound represented by the following formula (B). This enables even better water repellency and adhesiveness to be achieved.

[Chemical Formula 2]

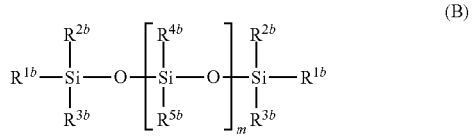

[wherein $R^{1b}$ represents an alkyl group, an alkoxy group or an aryl group, $R^{2b}$ and $R^{3b}$ each independently represent an alkoxy group, $R^{4b}$ and $R^{5b}$ each independently represent an alkyl group or an aryl group, and m represents an integer of 1 to 50.]

In the above-mentioned treatment agent, the liquid composition may further comprise at least one selected from the group consisting of a silane monomer having a hydrolyzable functional group or a condensable functional group, and a hydrolyzate of the silane monomer having a hydrolyzable functional group. This enables even better water repellency and adhesiveness to be achieved.

In the above-mentioned treatment agent, the liquid composition may further comprise aerogel particles. As a result, water repellency is further improved.

The above-mentioned treatment agent may be used to form a water-repellent portion on a surface to be treated of the fiber. By forming such a water-repellent portion, even better water repellency can be achieved. At this time, the water-repellent portion may contain an aerogel.

In addition, the present invention provides a treatment agent for treating fibers, the treatment agent comprising a water-repellent component comprising a compound having a structure represented by the following formula (1). Such a treatment agent is excellent in water repellency and thermal insulation properties.

[Chemical Formula 3]

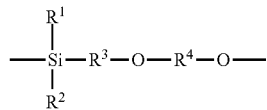

(1)

[wherein $R^1$ and $R^2$ each independently represent an alkyl group or an aryl group, and $R^3$ and $R^4$ each independently represent an alkylene group.]

Still further, the present invention provides a treatment agent for treating fibers, the treatment agent comprising a water-repellent component having a ladder structure comprising a strut portion and a bridge portion, wherein the bridge portion comprises a compound represented by the following formula (2). Such a treatment agent has excellent thermal insulation properties, water repellency, and durability due to the ladder structure.

[Chemical Formula 4]

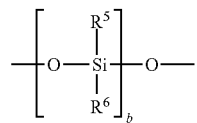

(2)

[wherein $R^5$ and $R^6$ each independently represent an alkyl group or an aryl group, and b represents an integer of 1 to 50.]

Examples of the compound having ladder structure include compounds having a structure represented by the following formula (3). This enables even better water repellency and durability to be achieved.

[Chemical Formula 5]

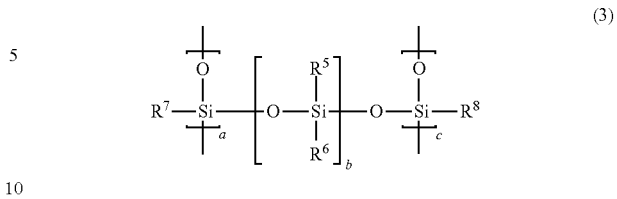

(3)

[wherein $R^5$, $R^6$, $R^7$, and $R^8$ each independently represent an alkyl group or an aryl group, a and c each independently represent an integer of 1 to 3000, and b represents an integer of 1 to 50.]

The above-mentioned water-repellent portion may comprise an aerogel. Further, the above-mentioned water-repellent component may be an aerogel. This enables even better water repellency and thermal insulation properties to be achieved.

The present invention provides a method for producing a surface-treated fiber, the method comprising a step of treating a fiber with the above-mentioned treatment agent. According to such a production method, fibers excellent in water repellency and thermal insulation properties can be produced.

The present invention provides a method for producing a surface-treated fiber sheet, the method comprising: a step of producing a fiber sheet by using surface-treated fibers obtained by the above-mentioned production method; or a step of treating a fiber sheet by using the above-mentioned treatment agent. According to such a production method, a fiber sheet excellent in water repellency and thermal insulation properties can be produced.

The present invention provides a surface-treated fiber, comprising: a fiber; and a treated portion comprising a dried product of the above-mentioned treatment agent on a surface to be treated of the fiber. Such a fiber is excellent in water repellency and thermal insulation properties.

The present invention provides a surface-treated fiber sheet comprising the above-mentioned surface-treated fiber. Such a fiber sheet is excellent in water repellency and thermal insulation properties.

The present invention provides a water-repellent fiber, comprising: a fiber; and a water-repellent portion comprising a compound having the structure represented by the above formula (1) on a surface to be treated of the fiber.

The present invention provides a water-repellent fiber, comprising: a fiber; and a water-repellent portion on a surface to be treated of the fiber, the water-repellent portion having a ladder structure comprising a strut portion and a bridge portion, wherein the bridge portion comprises a compound represented by the above formula (2). This fiber may also comprise the water-repellent portion comprising a compound having a structure represented by the above formula (3) on a surface to be treated. In this fiber, the water-repellent portion may also comprise an aerogel.

The present invention also provides a water-repellent fiber sheet comprising the water-repellent fiber of the present invention.

Advantageous Effects of Invention

According to the present invention, there can be provided a treatment agent for treating fibers which can impart excellent water repellency and thermal insulation properties to fibers. According to the present invention, there can also be provided a fiber production method, a fiber sheet production method, a fiber, and a fiber sheet using the above-mentioned treatment agent.

DESCRIPTION OF EMBODIMENTS

Figure 1:
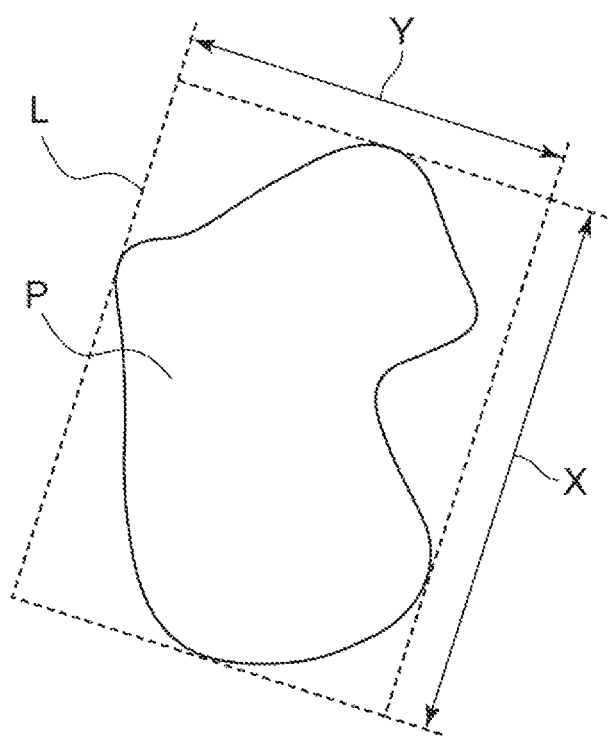
FIG. 1 is a diagram illustrating a method of calculating a two-axis average primary particle size of particles.

Hereinafter, preferred embodiments of the present invention will be described in detail with reference to the drawings as needed. However, the present invention is not limited to the following embodiments.

<Definitions>

As used herein, a numerical range indicated by using "to" indicates a range including the numerical values described before and after the "to" as the minimum value and the maximum value, respectively. In numerical ranges described in stages as used herein, the upper limit or lower limit of the numerical range of one stage may be replaced with the upper limit or lower limit of the numerical range of another stage. In the numerical ranges described herein, the upper limit value or the lower limit value of the numerical range may be replaced with a value shown in the Examples. "A or B" may contain either A or B, or may contain both. The materials exemplified herein can be used singly or in combination of two or more unless otherwise specified. As used herein, when a plurality of substances corresponding to each component is present in the composition, unless otherwise specified, the content of each component in the composition means the total amount of the plurality of substances present in the composition.

<Treatment Agent for Treating Fibers>

The treatment agent of the present embodiment is an agent for treating fibers. Examples of the treatment agent of the present embodiment include the following first to fourth aspects. By employing each aspect, it is possible to obtain water repellency and thermal insulation properties according to each aspect.

(First Aspect)

The treatment agent according to one embodiment includes a condensation product of a liquid composition containing at least one selected from the group consisting of a polysiloxane compound having a hydrolyzable functional group or a condensable functional group (in the molecule) and a hydrolyzate of the polysiloxane compound having a hydrolyzable functional group (hereinafter, sometimes referred to as "polysiloxane compound group"). The treatment agent may also include a liquid composition containing at least one selected from the group consisting of a polysiloxane compound having a hydrolyzable functional group or a condensable functional group and a hydrolyzate of the polysiloxane compound having a hydrolyzable functional group (the treatment agent may be the liquid composition). Such a treatment agent can impart excellent water repellency and thermal insulation properties to the fiber. The above-mentioned treatment agent may be used to form a water-repellent portion (treatment portion) on a surface to be treated of the fiber. The water-repellent portion formed from the above-mentioned treatment agent has excellent water repellency and also has excellent adhesiveness to the surface to be treated. The water-repellent portion formed from the above-mentioned treatment agent is excellent also in thermal insulation properties, and hence the fiber can be provided with an excellent thermal insulation function. The water-repellent portion may include, for example, at least one of a film-like water-repellent portion (hereinafter, also referred to as a "water-repellent film") and a particulate water-repellent portion (hereinafter, also referred to as "water-repellent particles"). More specifically, the treatment agent of the present embodiment may form a water-repellent film and/or water-repellent particles on the surface to be treated of the fiber.

The present inventors speculate that the reason why the treatment agent of the present embodiment exhibits excellent water repellency is as follows. It is considered that because the treatment agent of the present embodiment contains a polysiloxane compound group, reactions are controlled more easily than, for example, a treatment agent containing only a siloxane monomer as a siloxane compound. As a result, it is considered that it is easier to decrease hydrophilic groups (e.g., hydroxyl groups (OH groups)) in the compound forming the water-repellent portion, and that excellent water repellency is exhibited.

Further, it is considered that the water-repellent portion formed from the treatment agent of the present embodiment is resistant to adhesiveness of hydrophilic stains and that it is easier to remove such stains. Therefore, it is considered that the above-mentioned treatment agent is easy to apply to applications in which hydrophilic stains tend to adhere.

In conventional water-repellent finishing, an adhesive, an additive, and the like are generally added to improve the adhesion between the water-repellent treatment agent and the fibers. On the other hand, when an adhesive and an additive are added, usually, water repellency, abrasion resistance, and solvent resistance tend to decrease. In contrast, since the treatment agent of the present embodiment is also excellent in adhesiveness, water repellency, abrasion resistance, and solvent resistance, it is considered that the above-mentioned adhesive and additive are not necessarily required.

Moreover, it cannot be said that the fibers obtained by the method of Patent Literature 1 are sufficient in terms of water repellency. The reason for this is considered to be that, for example, while the water-repellent particles involved in water repellency are water-repellent particles on the surface of the fibers, in the method of Patent Literature 1, the amount of water-repellent particles appearing the fiber surface based on the amount of water-repellent particles contained in the entire fiber is small. On the other hand, it is considered that when the amount of water-repellent particles is increased in order to improve water repellency, the amount of water-repellent particles inside the fibers also increases, so that the nature of the fibers themselves changes (the fibers become hard, brittle, etc.), and spinning cannot be performed. In contrast hand, it is considered that the treatment agent of the present embodiment can impart water repellency without harming the properties of the fibers themselves.

Examples of the hydrolyzable functional group include an alkoxy group. Examples of the condensable functional group (excluding the functional group corresponding to the hydrolyzable functional group) include a hydroxyl group, a silanol group, a carboxyl group, and a phenolic hydroxyl group. The hydroxyl group may be contained in a hydroxyl group-containing group such as a hydroxyalkyl group. The polysiloxane compound having a hydrolyzable functional group or a condensable functional group may further have a reactive group different from the hydrolyzable functional group and the condensable functional group (a functional group not corresponding to the hydrolyzable functional group or the condensable functional group). Examples of the reactive groups include an epoxy group, a mercapto group, a glycidoxy group, a vinyl group, an acryloyl group, a methacryloyl group, and an amino group. The epoxy group may be contained in an epoxy group-containing group such as a glycidoxy group. The polysiloxane compound having these functional groups and reactive groups may be used singly or in a mixture of two or more. Among these functional groups and reactive groups, an alkoxy group, a silanol group, and a hydroxyalkyl group can improve the compatibility of the treatment agent and can suppress layer separation. Further, from the viewpoint of improving the reactivity of the polysiloxane compound, the number of carbons of the alkoxy group and the hydroxyalkyl group may be, for example, 1 to 6.

Examples of the polysiloxane compound having a hydroxyalkyl group include a compound having a structure represented by the following formula (A).

[Chemical Formula 6]

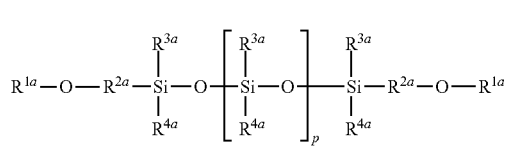

(A)

In formula (A), $R^{1a}$ represents a hydroxyalkyl group, $R^{2a}$ represents an alkylene group, $R^{3a}$ and $R^{4a}$ each independently represent an alkyl group or an aryl group, and n represents an integer of 1 to 50. Here, examples of the aryl group include a phenyl group, and a substituted phenyl group. Further, examples of the substituent of the substituted phenyl group include an alkyl group, a vinyl group, a mercapto group, an amino group, a nitro group, and a cyano group. In formula (A), two $R^{1a}$ may be the same as or different from each other, and similarly, two $R^{2a}$ may be the same as or different from each other. In addition, in formula (A), two or more $R^{1a}$ may be the same or different from each other, and similarly, two or more $R^4a$ may be the same as or different from each other.

By using a treatment agent containing the polysiloxane compound having the above-mentioned structure, it is even easier to obtain excellent water repellency and adhesiveness. From such a viewpoint, in formula (A), examples of $R^{1a}$ include a hydroxyalkyl group in which the number of carbon atoms is 1 to 6; examples of the hydroxyalkyl group include a hydroxyethyl group and a hydroxypropyl group. Further, in formula (A), examples of $R^{2a}$ include an alkylene group in which the number of carbon atoms is 1 to 6; examples of the alkylene group include an ethylene group and a propylene group. In formula (A), examples of $R^{1a}$ and $R^{4a}$ include, each independently, an alkyl group in which the number of carbon atoms is 1 to 6 and a phenyl group; examples of the alkyl group include a methyl group. Further, in formula (A), n may be, for example, 2 to 30, or 5 to 20

A commercial product can be used as the polysiloxane compound having a structure represented by the above formula (A); examples thereof include compounds such as X-22-160AS, KF-6001, KF-6002, and KF-6003 (all of these being manufactured by Shin-Etsu Chemical Co., Ltd.), and compounds such as XF42-B0970, XF42-05277, Fluid OFOH 702-4% (all of these being manufactured by Momentive).

Examples of the polysiloxane compound having an alkoxy group include compounds having a structure represented by the following formula (B).

[Chemical Formula 7]

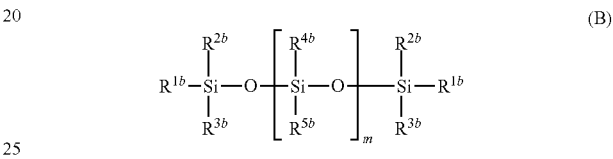

(B)

In formula (B), $R^{1b}$ represents an alkyl group, an alkoxy group or an aryl group, $R^{2b}$ and $R^{3b}$ each independently represent an alkoxy group, $R^{4b}$ and $R^{5b}$ each independently represent an alkyl group or an aryl group, and m represents an integer of 1 to 50. Here, examples of the aryl group include a phenyl group and a substituted phenyl group. Further, examples of the substituent of the substituted phenyl group include an alkyl group, a vinyl group, a mercapto group, an amino group, a nitro group, and a cyano group. In formula (B), two $R^{1b}$ may be the same as or different from each other, two $R^{2b}$ may be the same as or different from each other, and similarly two $R^{3b}$ may be the same as or different from each other. In addition, in formula (B), when m is an integer of 2 or more, two or more $R^{4b}$ may be the same or different from each other, and similarly, two or more $R^{5b}$ may also be the same as or different from each other.

By using a polysiloxane compound having the above-mentioned structure or a treatment agent containing a hydrolyzate thereof, it is even easier to obtain excellent water repellency and adhesiveness. From such a viewpoint, in formula (B), examples of $R^{1b}$ include an alkyl group in which the number of carbon atoms is 1 to 6, and an alkoxy group in which the number of carbon atoms is 1 to 6; examples of the alkyl group or the alkoxy group include a methyl group, a methoxy group, and an ethoxy group. In formula (B), examples of $R^{2b}$ and $R^{3b}$ include, each independently, an alkoxy group in which the number of carbon atoms is 1 to 6; examples of the alkoxy group include a methoxy group and an ethoxy group. In formula (B), examples of $R^{4b}$ and $R^{5b}$ include, each independently, an alkyl group in which the number of carbon atoms is 1 to 6 and a phenyl group; examples of the alkyl group include a methyl group. In formula (B), m may be, for example, 2 to 30, or 5 to 20.

The polysiloxane compound having a structure represented by the above formula (B) can be obtained by, for example, appropriately referring to the production methods reported in Japanese Unexamined Patent Publication No. 2000-26609, Japanese Unexamined Patent Publication No. 2012-233110, and the like.

In addition, since the alkoxy group is hydrolyzed, the polysiloxane compound having an alkoxy group may be present as a hydrolyzate in the liquid composition, or the polysiloxane compound having an alkoxy group and a hydrolyzate thereof may both be present. Further, in the polysiloxane compound having an alkoxy group, the alkoxy groups in the molecule may all be hydrolyzed or may be partially hydrolyzed.

The polysiloxane compound having a hydrolyzable functional group or a condensable functional group and the hydrolyzate of the polysiloxane compound having a hydrolyzable functional group may be used singly or in a mixture of two or more.

The treatment agent of the present embodiment may further contain silica particles from the viewpoint of further improving water repellency and thermal insulation properties. Specifically, the liquid composition may contain silica particles and at least one selected from the group consisting of a polysiloxane compound having a hydrolyzable functional group or a condensable functional group and a hydrolyzate of the polysiloxane compound having a hydrolyzable functional group. In such a treatment agent, the reason why water repellency is improved is thought to be because when the treatment agent contains silica particles, in the compound constituting the water-repellent portion, Q+T:D described later can be easily controlled, and it is easy to reduce the amount of hydroxyl groups in the above-mentioned compound.

The silica particles can be used without particular limitation, and examples thereof include amorphous silica particles. Examples of the amorphous silica particles include fused silica particles, fumed silica particles, and colloidal silica particles. Among these, colloidal silica particles are high in monodispersity and easily suppress aggregation in the treatment agent.

The shape of the silica particles is not particularly limited, and examples thereof include a spherical shape, a cocoon shape, and associated types. Among these, by using spherical particles as the silica particles, aggregation in the treatment agent is more easily suppressed. The average primary particle size of the silica particles may be, for example, from the viewpoint of more easily obtaining a water-repellent film and/or water-repellent particles having an appropriate hardness and the viewpoint of more easily improving durability against thermal shocks and scratches, 1 nm or more, 5 nm or more, or 20 nm or more. The average primary particle size of the silica particles may be, for example, from the viewpoint of more easily obtaining a transparent water-repellent film and/or water-repellent particles, 200 nm or less, 150 nm or less, or 100 nm or less. From these viewpoints, the average primary particle size of the silica particles may be, for example, 1 to 200 nm, 5 to 150 nm, or 20 to 100 nm. The silica particles may be particles having a hollow structure, a porous structure, or the like.

The average particle size of the silica particles can be measured from the raw material. For example, a two-axis average primary particle size is calculated as follows from the result of observing 20 arbitrary particles by SEM. That is, for example, in the case of colloidal silica particles having a solid content concentration of 5 to 40% by mass usually dispersed in water, a chip obtained by cutting a wafer with pattern wiring into 2-cm squares is soaked in a dispersion of the colloidal silica particles for about 30 seconds, then the chip is rinsed with pure water for about 30 seconds, and blown dry with nitrogen. Then, the chip is placed on a sample stage for SEM observation, an acceleration voltage of 10 kV is applied, the silica particles are observed at a magnification of 100000×, and an image is photographed. Twenty silica particles are arbitrarily selected from the obtained image, and the average of the particle size of those particles is taken as the average particle size. In this case, when the selected silica particles are a shape as illustrated in FIG. 1, a rectangle (circumscribed rectangle L) is derived by circumscribing a silica particle P such that the long side of the rectangle is the maximum possible length. Then, assuming that the long side of the circumscribed rectangle L is X and the short side is Y, the two-axis average primary particle size is calculated as (X+Y)/2, and taken as the particle size of the particle.

The number of silanol groups per g of the above-mentioned silica particles may be, for example, from the viewpoint of having excellent reactivity and easily imparting excellent water repellency and adhesiveness at low temperature and in a short time, $10 \times 10^{18}$ groups/g or more, $50 \times 10^{18}$ groups/g or more, or $100 \times 10^{18}$ groups/g or more. The number of silanol groups per g of the silica particles may be, for example, from the viewpoint of easily suppressing sudden gelation during treatment and obtaining a uniform water-repellent film and/or water-repellent particles, $1000 \times 10^{18}$ groups/g or less, $800 \times 10^{18}$ groups/g or less, or $700 \times 10^{18}$ groups/g or less. From these viewpoints, the number of silanol groups per g of the silica particles may be, for example, $10 \times 10^{18}$ to $1000 \times 10^{18}$ groups/g, $50 \times 10^{18}$ to $800 \times 10^{18}$ groups/g, or $100 \times 10^{18}$ to $700 \times 10^{18}$ groups/g.

The content of the silica particles may be, for example, from the viewpoint of improving the reactivity of the treatment agent and from the viewpoint of easily imparting excellent water repellency and adhesiveness at low temperature and in a short time, per 100 parts by mass of the total amount of the liquid composition, 0.01 parts by mass or more, 0.1 parts by mass or more, or 0.5 parts by mass or more. The content of the silica particles may be, for example, from the viewpoint of more easily obtaining a water-repellent film and/or water-repellent particles having an appropriate hardness and the viewpoint of more easily improving durability against thermal shocks and scratches, per 100 parts by mass of the total amount of the liquid composition, 30 parts by mass or less, 20 parts by mass or less, or 10 parts by mass or less. From these viewpoints, the content of the silica particles may be, for example, per 100 parts by mass of the total amount of the liquid composition, 0.01 to 30 parts by mass, 0.1 to 20 parts by mass, or 0.5 to 10 parts by mass.

The liquid composition may further include, for example, from the viewpoint of further improving water repellency and adhesiveness, a silicon compound other than the polysiloxane compound (excluding the polysiloxane compound). Specifically, the liquid composition may further contain at least one selected from the group consisting of a silane monomer having a hydrolyzable functional group or a condensable functional group, and a hydrolyzate of the silane monomer having a hydrolyzable functional group (hereinafter, sometimes referred to as "silane monomer group"). The number of silicons in a molecule of the silane monomer can be 1 to 6.

Examples of the silane monomer having a hydrolyzable functional group include, but are not particularly limited to, alkyl silicon alkoxides. Among alkyl silicon alkoxides, an alkyl silicon alkoxide in which the number of hydrolyzable functional groups is 3 or less can further improve water resistance. Examples of such alkyl silicon alkoxides include monoalkyltrialkoxysilanes, monoalkyldialkoxysilanes, dialkyldialkoxysilanes, monoalkylmonoalkoxysilanes, dialkylmonoalkoxysilanes, and trialkylmonoalkoxysilanes. Specifically, examples thereof include methyltrimethoxysilane, methyldimethoxysilane, dimethyldimethoxysilane, and ethyltrimethoxysilane.

Examples of the silane monomer having a condensable functional group include, but are not particularly limited to, silanetetraol, methylsilanetriol, dimethylsilanediol, phenylsilanetriol, phenylmethylsilanediol, diphenylsilanediol, n-propylsilanetriol, hexylsilanetriol, octylsilanetriol, decylsilanetriol, and trifluoropropylsilanetriol.

The silane monomer having a hydrolyzable functional group or a condensable functional group may further have the above-described reactive group different from the hydrolyzable functional group and the condensable functional group.

As a silane monomer in which the number of hydrolyzable functional groups is 3 or less and that has a reactive group, there may also be used vinyltrimethoxysilane, 3-glycidoxypropyltrimethoxysilane, 3-glycidoxypropylmethyldimethoxysilane 3-Methacryloxypropyltrimethoxysilane, 3-methacryloxypropylmethyldimethoxysilane, 3-acryloxypropyltrimethoxysilane, 3-mercaptopropyltrimethoxysilane, 3-mercaptopropylmethyldimethoxysilane, N-phenyl-3-aminopropyltrimethoxysilane, N-2-(aminoethyl)-3-aminopropylmethyldimethoxysilane, and the like.

Further, as a silane monomer having a condensable functional group and a reactive group, there may also be used vinylsilanetriol, 3-glycidoxypropylsilanetriol, 3-glycidoxypropylmethylsilanediol, 3-methacryloxypropylsilanetriol, 3-methacryloxypropylmethylsilanediol, 3-acryloxypropylsilanetriol, 3-mercaptopropylsilanetriol, 3-mercaptopropylmethylsilanediol, N-phenyl-3-aminopropylsilanetriol, N-2-(aminoethyl)-3-aminopropylmethylsilanediol, and the like.

In addition, there may also be used bistrimethoxysilylmethane, bistrimethoxysilylethane, bistrimethoxysilylhexane, ethyltrimethoxysilane, vinyltrimethoxysilane, and the like, which are silane monomers in which the number of hydrolyzable functional groups at the molecular ends is 3 or less.

These silane monomers having a hydrolyzable functional group or a condensable functional group, and hydrolyzates of a silane monomer having a hydrolyzable functional group, may be used singly or in a mixture of two or more.

In addition, since the hydrolyzable functional group such as an alkoxy group is hydrolyzed, the silane monomer having a hydrolyzable functional group may be present as a hydrolyzate in the liquid composition, and the silane monomer having a hydrolyzable functional group and a hydrolyzate thereof may both be present. Further, in the silane monomer having a hydrolyzable functional group, the hydrolyzable functional groups in the molecule may all be hydrolyzed or may be partially hydrolyzed.

The content of the polysiloxane compound group (the total of the content of the polysiloxane compound having a hydrolyzable functional group or a condensable functional group and the content of the hydrolyzate of the polysiloxane compound having a hydrolyzable functional group) may be, for example, from the viewpoint of even more easily improving water repellency, per 100 parts by mass of the total amount of the liquid composition, 0.01 parts by mass or more, 0.1 parts by mass or more, or 0.5 parts by mass or more. The content of the polysiloxane compound group may be, for example, from the viewpoint of more easily obtaining a water-repellent film and/or water-repellent particles having an appropriate hardness and the viewpoint of more easily improving durability against thermal shocks and scratches, per 100 parts by mass of the total amount of the liquid composition, 50 parts by mass or less, 30 parts by mass or less, or 10 parts by mass or less. From these viewpoints, the content of the polysiloxane compound group may be, for example, per 100 parts by mass of the total amount of the liquid composition, 0.01 to 50 parts by mass, 0.1 to 30 parts by mass, or 0.5 to 10 parts by mass.

When the treatment agent of the present embodiment further contains a silane monomer group in the liquid composition, the ratio between the content of the polysiloxane compound group and the content of the silane monomer group (the total of the content of the silane monomer having a hydrolyzable functional group or a condensable functional group and the content of the hydrolyzate of the silane monomer having a hydrolyzable functional group) may be, for example, from the viewpoint of even more easily improving water repellency and easily obtaining good compatibility, 1:0.1 or more, or 1:1 or more. The ratio between the content of these compounds may be, for example, from the viewpoint of more easily obtaining a water-repellent film and/or water-repellent particles having an appropriate hardness and the viewpoint of more easily improving durability against thermal shocks and scratches, 1:10 or less, or 1:5 or less. From these viewpoints, the ratio between the content of the polysiloxane compound group and the content of the silane monomer group may be, for example, 1:0.1 to 1:10, or 1:1 to 1:5.

The total content of the polysiloxane compound group and the silane monomer group may be, from the viewpoint of even more easily improving of water repellency, per 100 parts by mass of the total amount of the liquid composition, for example, 0.01 parts by mass or more, 0.1 parts by mass or more, or 0.5 parts by mass or more. This total content may be, from the viewpoint of more easily obtaining a water-repellent film and/or water-repellent particles having an appropriate hardness and the viewpoint of more easily improving durability against thermal shocks and scratches, per 100 parts by mass of the total amount of the liquid composition, for example, 60 parts by mass or less, 30 parts by mass or less, 20 parts by mass or less, or 10 parts by mass or less. From these viewpoints, the total content of the polysiloxane compound group and the silane monomer group may be, per 100 parts by mass of the total amount of the liquid composition, for example, 0.01 to 60 parts by mass, 0.01 to 30 parts by mass, 0.1 to 20 parts by mass, or 0.5 to 10 parts by mass. At this time, the ratio of the content of the polysiloxane compound group and the content of the silane monomer group can be in the above range.

The treatment agent of the present embodiment may include aerogel particles from the viewpoint of improving water repellency. That is, the liquid composition may contain aerogel particles and at least one selected from the group consisting of a polysiloxane compound having a hydrolyzable functional group or a condensable functional group and a hydrolyzate of the polysiloxane compound having a hydrolyzable functional group. An aerogel is a porous body having nanometer-sized fine pores. Aerogel particles are considered to exhibit excellent water repellency because there are few hydroxyl groups on their surface and because it is difficult for water to enter into the fine pores.

As the aerogel particles, conventionally known aerogel particles can be used without particular limitation, but aerogel particles formed by using as a raw material the polysiloxane compound, the silane monomer, or the like contained in the liquid composition may also be used. Such an aerogel (particles) can be obtained by drying a wet gel which is a condensation product of a sol containing the polysiloxane compound and the like.

The average primary particle size of the aerogel particles may be, from the viewpoint of easily obtaining good water repellency, for example, 0.1 to 10000 nm, 1 to 1000 nm, or 2 to 100 nm.

The content of the aerogel particles may be, from the viewpoint of easily obtaining good dispersibility, per 100 parts by mass of the total amount of the liquid composition, for example, 0.1 to 10 parts by mass, 0.5 to 5 parts by mass, or 0.8 to 3 parts by mass.

The treatment agent according to another embodiment may be an aspect including a water-repellent component. The water-repellent component may be, for example, a condensation product of the liquid composition described above. The shape of the water-repellent component according to the present embodiment may be, for example, particulate. Hereinafter, specific aspects of treatment agents containing a water-repellent component will be described as second to fourth aspects.

(Second Aspect)

The treatment agent of the present embodiment can include a water-repellent component containing a polysiloxane having a main chain including a siloxane bond (Si—O—Si). The water-repellent component can have the following M unit, D unit, T unit, or Q unit as a structural unit.

[Chemical Formula 8]

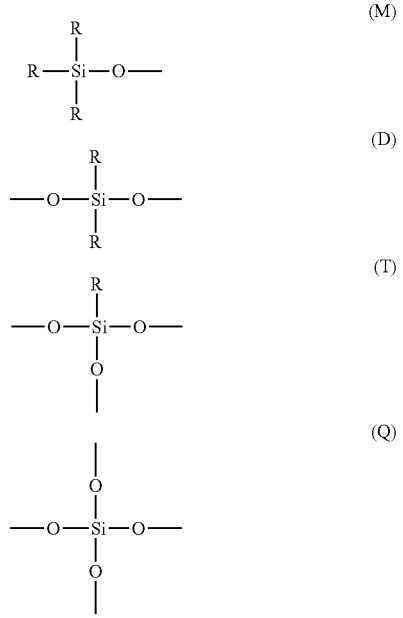

In the above formula, R represents an atom (e.g., a hydrogen atom) or an atomic group (e.g., an alkyl group) bonded to a silicon atom. The M unit is a unit consisting of a monovalent group in which a silicon atom is bonded to one oxygen atom. The D unit is a unit consisting of a divalent group in which a silicon atom is bonded to two oxygen atoms. The T unit is a unit consisting of a trivalent group in which a silicon atom is bonded to three oxygen atoms. The Q unit is a unit consisting of a tetravalent group in which a silicon atom is bonded to four oxygen atoms. Information on the content of these units can be obtained by Si-NMR.

The treatment agent of the present embodiment may contain a water-repellent component having, in solid $^{29}$Si-NMR spectra as measured by using the DD/MAS method, when the silicon-containing bonding units Q, T, and D are defined as follows, the ratio Q+T:D between the signal area derived from Q and T and the signal area derived from D of 1:0.01 to 1:1.00.

Q: A silicon-containing bonding unit comprising four oxygen atoms that are bonded to one silicon atom.

T: A silicon-containing bonding unit comprising three oxygen atoms and one hydrogen atom or one monovalent organic group that are bonded to one silicon atom.

D: A silicon-containing bonding unit comprising two oxygen atoms and two hydrogen atoms or two monovalent organic groups that are bonded to one silicon atom.

However, the organic group is a monovalent organic group in which an atom bonded to the silicon atom is a carbon atom.

Such a treatment agent is excellent in water repellency and thermal insulation properties, and also excellent in adhesiveness with fibers.

The ratio Q+T:D between a signal area derived from Q and T and a signal area derived from D may be, for example, 1:0.01 to 1:0.70, 1:0.01 to 1:0.50, 1:0.02 to 1:0.50, or 1:0.03 to 1:0.50. By setting the signal area ratio to 1:0.01 or more, better water repellency tends to be obtained, and by setting the signal area ratio to 1:0.70 or less, better thermal insulation properties and adhesiveness tend to be obtained.

Note that an "oxygen atom" in Q, T, and D as described below is mainly an oxygen atom connecting between two silicon atoms, but, for example, a case where it is an oxygen atom that is possessed by a hydroxyl group and is bonded to a silicon atom is also conceivable. Also, an "organic group" is a monovalent organic group where the atom that is bonded to the silicon atom is a carbon atom. Examples of such a group include an unsubstituted or substituted monovalent organic group in which the number of carbon atoms is 1 to 10. Examples of the unsubstituted monovalent organic group include hydrocarbon groups such as an alkyl group, an alkenyl group, an alkynyl group, a cycloalkyl group, an aryl group, and an aralkyl group. Examples of the substituted monovalent organic group include hydrocarbon groups (substituted organic groups) in which a hydrogen atom of the above-mentioned hydrocarbon groups is substituted by a halogen atom, a predetermined functional group, a predetermined functional group-containing organic group, or the like, or, hydrocarbon groups in which particularly a hydrogen atom of a ring of a cycloalkyl group, an aryl group, an aralkyl group, or the like, is substituted by an alkyl group. Examples of the halogen atoms include a chlorine atom and a fluorine atom (namely, atoms which produce a halogen atom-substituted organic group such as a chloroalkyl group or a polyfluoroalkyl group). Examples of the functional group include a hydroxyl group, a mercapto group, a carboxyl group, an epoxy group, an amino group, a cyano group, an acryloyloxy group, and a methacryloyloxy group. Examples of the functional group-containing organic group include an alkoxy group, an acyl group, an acyloxy group, an alkoxycarbonyl group, a glycidyl group, an epoxy cyclohexyl group, an alkylamino group, a dialkylamino group, an arylamino group, and an N-aminoalkyl substituted aminoalkyl group.

The signal area ratio can be confirmed based on solid $^{29}$Si-NMR spectra. In general, the measurement technique for the solid $^{29}$Si-NMR spectra is not particularly limited; examples thereof may include a CP/MAS method and a DD/MAS method; in the present embodiment, the DD/MAS method is employed from the viewpoint of quantitatively.

Chemical shifts of the silicon-containing bonding units Q, T, and D in the solid $^{29}$Si-NMR spectra are, respectively, observed in the region of −90 to −120 ppm for the Q unit, −45 to −80 ppm for the T unit, and 0 to −40 ppm for the D unit. Therefore, it is possible to separate the signals of the silicon-containing bonding units Q, T, and D, and to calculate the signal area derived from each unit. Note that in analyzing the spectra, it is possible to, from the viewpoint of improving analytical accuracy, employ the exponential function as the Window function and at the same time to set the line broadening coefficient in a range of 0 to 50 Hz.

Figure 2:
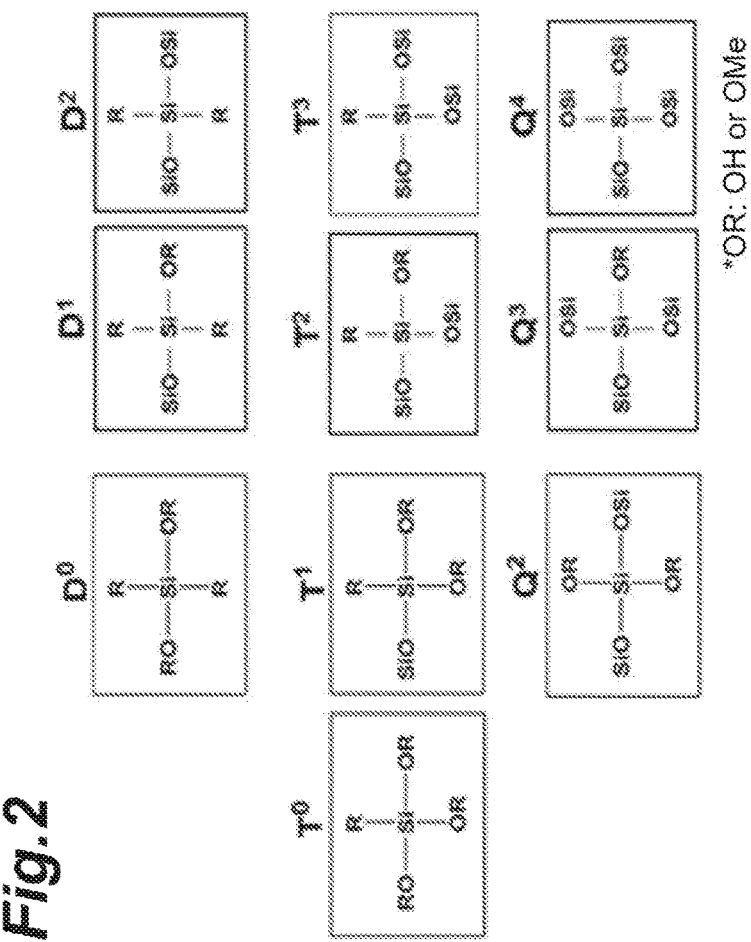
FIG. 2 is a diagram illustrating a solid $^{29}$Si-NMR spectrum of a water-repellent portion in a water-repellent fiber sheet 7 measured by using a DD/MAS method.
Figure 2:
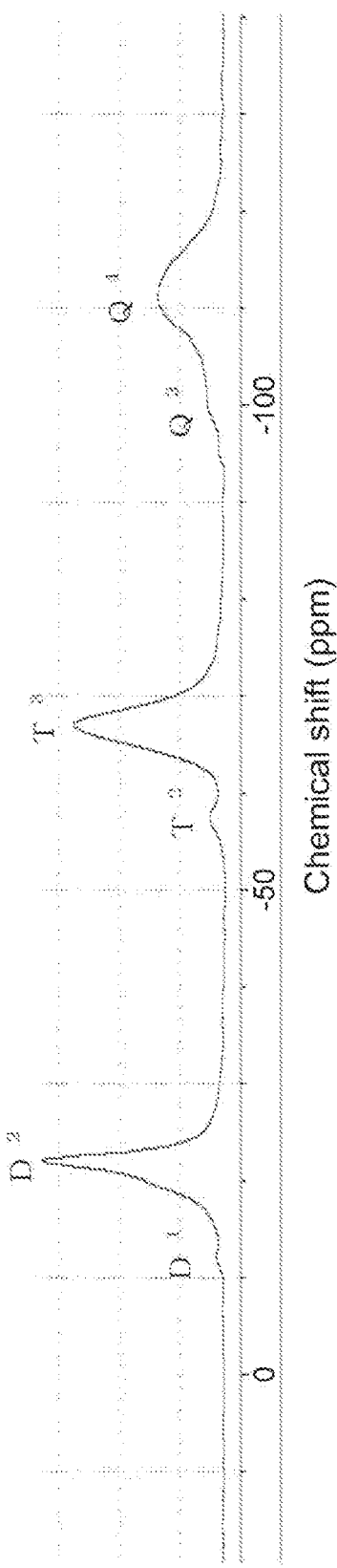

For example, FIG. 2 is a diagram illustrating a solid $^{29}$Si-NMR spectrum of a water-repellent portion in a water-repellent fiber sheet 7 measured by using the DD/MAS method to be used in the Examples described later. As illustrated in FIG. 2, the signals of the silicon-containing bonding units Q, T, and D can be separated based on the solid $^{29}$Si-NMR spectra using the DD/MAS method.

Here, the method of calculating the signal area ratio will be described with reference to FIG. 2. For example, in FIG. 2, the Q unit signal derived from silica is observed in the chemical shift range of −90 to −120 ppm. Also, the T unit signal derived from the polysiloxane compound and the trimethoxysilane reaction product is observed in the chemical shift range of −45 to −80 ppm. In addition, the D unit signal derived from the polysiloxane compound and the dimethyldimethoxysilane reaction product is observed in the chemical shift range of 0 to −40 ppm. Signal areas (integrated values) are obtained by integrating the signals in the respective chemical shift ranges. When the signal area of the sum of the Q unit and the T unit is set as 1, the signal area ratio of Q+T:D in FIG. 2 is calculated to be 1:0.42. Note that the signal areas are calculated by using general spectrum analysis software (such as NMR software "TopSpin" manufactured by Bruker (TopSpin is a registered trademark)).

(Third Aspect)

The treatment agent of the present embodiment may contain a water-repellent component including a compound having a structure represented by the following formula (1). The water-repellent component according to the present embodiment can include a compound having a structure represented by the following formula (1a) as a structure including the structure represented by formula (1). For example, the condensation product of the liquid composition including a polysiloxane compound having a structure represented by the above formula (A) can include a water-repellent component including a compound having a structure represented by formula (1) and formula (1a) in its skeleton.

In formulas (1) and (1a), $R^1$ and $R^2$ each independently represent an alkyl group or an aryl group, and $R^3$ and $R^4$ each independently represent an alkylene group. Here, examples of the aryl group include a phenyl group and a substituted phenyl group. In addition, examples of a substituent of the substituted phenyl group include an alkyl group, a vinyl group, a mercapto group, an amino group, a nitro group, and a cyano group. p represents an integer of 1 to 50. In formula (1a), two or more $R^1$ may be the same as or different from each other, and similarly, two or more $R^2$ may be the same as or different from each other. In formula (1a), two $R^3$ may be the same as or different from each other, and similarly, two $R^4$ may be the same as or different from each other.

When the treatment agent contains a water-repellent component including a compound having a structure represented by the above formula (1) or formula (1a), water repellency and thermal insulation properties are further improved, and the adhesiveness is also improved. From such viewpoint, in formulas (1) and (1a), examples of $R^1$ and $R^2$ include, each independently, represent an alkyl group in which the number of carbon atoms is 1 to 6 and phenyl group; examples of the alkyl group include a methyl group. In formulas (1) and (1a), examples of include, $R^3$ and $R^4$ each independently, an alkylene group in which the number of carbon atoms is 1 to 6; examples of the alkylene group include an ethylene group and a propylene group. In formula (1a), for example, p may be 2 to 30, or 5 to 20.

(Fourth Aspect)

The treatment agent of the present embodiment may have a ladder structure comprising strut portions and bridge portions. The bridge portions may contain a water-repellent component including a compound represented by the following formula (2). By including such a compound having a ladder structure in its skeleton, the water-repellent component can further improve thermal insulation properties and water repellency, as well as improve mechanical strength. That is, the treatment agent of the present embodiment has excellent thermal insulation properties, water repellency and durability due to the ladder structure. For example, the condensation product of the liquid composition including a polysiloxane compound having a structure represented by the above formula (B) may include a water-repellent component including a compound having in its skelton a ladder structure having a bridge portion represented by formula (2). In the present embodiment, a "ladder structure" is a structure having two strut portions (struts) and bridge portions (bridges) connecting the strut portions to each other (i.e., a structure having a so-called "hashigo" (ladder) form). In this aspect, the ladder structure may be an aspect included in a part of the compound.

[Chemical Formula 9]

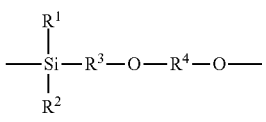
(1)

[Chemical Formula 10]

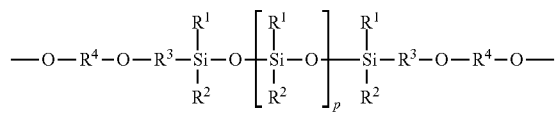
(1a)

[Chemical Formula 11]

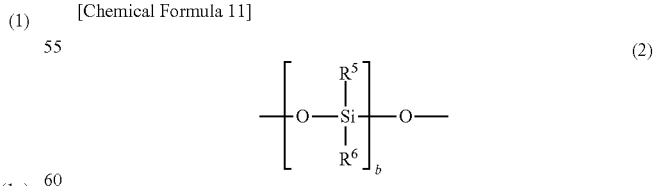
(2)

In formula (2), $R^5$ and $R^6$ each independently represent an alkyl group or an aryl group, and b represents an integer of 1 to 50. Here, examples of the aryl group include a phenyl group and a substituted phenyl group. Further, examples of a substituent of the substituted phenyl group include an alkyl group, a vinyl group, a mercapto group, an amino group, a nitro group, and a cyano group. In addition, in formula (2), when b is an integer of 2 or more, two or more $R^5$ may be the same as or different from each other, and similarly, two or more $R^6$ may also be the same as or different from each other.

The structure serving as the strut portion and the chain length thereof, and the spacing between the structures serving as the bridge portion, are not particularly limited; however, from the viewpoint of further improving water repellency, mechanical strength, and durability, examples of the ladder structure include the ladder structure represented by the following formula (3).

[Chemical Formula 12]

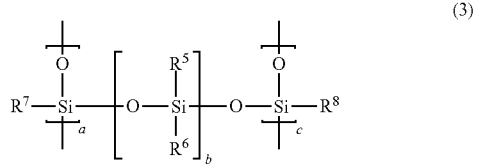

(3)

In formula (3), $R^5$, $R^6$, $R^7$, and $R^8$ each independently represent an alkyl group or an aryl group, a and c each independently represent an integer of 1 to 3000, and b represents an integer of 1 to 50. Here, examples of the aryl group include a phenyl group and a substituted phenyl group. Further, examples of a substituent of the substituted phenyl group include an alkyl group, a vinyl group, a mercapto group, an amino group, a nitro group, and a cyano group. In addition, in formula (3), when b is an integer of 2 or more, two or more $R^5$ may be the same as or different from each other, and similarly, two or more $R^6$ may also be the same as or different from each other. Still further, in formula (3), when b is an integer of 2 or more, two or more $R^7$ may be the same as or different from each other, and similarly, when c is an integer of 2 or more, two or more $R^8$ may be the same as or different from each other.

From the viewpoint of obtaining even better water repellency, in formulas (2) and (3), examples of $R^5$, $R^6$, $R^7$, and $R^8$ (wherein $R^7$ and $R^8$ are only in formula (3)) include, each independently, an alkyl group in which the number of carbon atoms is 1 to 6 and a phenyl group; examples of the alkyl group include a methyl group. In formula (3), a and c may each independently be, for example, 6 to 2000, or 10 to 1000. Further, in formulas (2) and (3), b may be, for example, 2 to 30, or 5 to 20.

From the viewpoint of improving water repellency, the water-repellent component contained in the treatment agent may be composed of an aerogel. Since aerogels have a large porosity, it is considered that a water-repellent component (and a water-repellent film and water-repellent particles formed therefrom) composed of an aerogel has a small refractive index and high transparency.

<Water-Repellent Fibers and Water-Repellent Fiber Sheet>

The water-repellent fibers are obtained by treating fibers with the above-mentioned treatment agent. The water-repellent fiber sheet is obtained by treating a fiber sheet with the above-mentioned treatment agent. The water-repellent fiber sheet can also be obtained by using water-repellent fibers treated with the treatment agent. Since the water-repellent fibers and the water-repellent fiber sheet are both obtained by a surface treatment of the surface to be treated by using the above-mentioned treatment agent, the water-repellent fibers and the water-repellent fiber sheet can be referred to as surface-treated fibers and a surface-treated fiber sheet, respectively. Such water-repellent fibers and a water-repellent fiber sheet are excellent in water repellency and thermal insulation properties.

In the water-repellent fibers and the water-repellent fiber sheet according to one embodiment, a water-repellent portion is formed on the surface to be treated of the fiber and fiber sheet, respectively; the water-repellent portion includes a dried product of the above-mentioned treatment agent. If the treatment agent includes a condensation product of the above-mentioned liquid composition, it is considered that the condensation reaction further proceeds when the water-repellent portion is formed; in addition, if the treatment agent is the above liquid composition itself, it is considered that a condensation reaction occur when the water-repellent portion is formed. Therefore, it can be said that the water-repellent portion includes a reaction product of the treatment agent.

The water-repellent portion also has, for example, a function as a heat insulating portion. The water-repellent portion may be in a form including at least one of a water-repellent film and water-repellent particles. The water-repellent fibers and the water-repellent fiber sheet of the present embodiment have a water-repellent portion (heat insulating portion) including a dried product of the treatment agent of the present embodiment, and hence are excellent in water repellency and thermal insulation properties, as well as in the adhesiveness between the surface to be treated and the water-repellent portion. Moreover, such water-repellent fibers and water-repellent fiber sheet are also excellent in durability. The water-repellent fibers and the water-repellent fiber sheet of the present embodiment may be formed by, for example, forming a water-repellent film and/or water-repellent particles on the surface to be treated of the fibers with the above-mentioned treatment agent. Here, a preferable aspect of the water-repellent portion (water-repellent particles etc.) formed on the surface to be treated may be similar to, for example, the water-repellent component described above. Specifically, the fibers (water-repellent fiber) of the present embodiment may comprise, for example, a water-repellent portion including a compound having a structure represented by the above formula (1), or comprise a water-repellent portion having a ladder structure provided with strut portions and bridge portions, in which the bridge portions contain a compound represented by the following formula (2), or comprise a water-repellent portion containing a compound having a structure represented by the above formula (3).

From the viewpoint of further improving water repellency, the water-repellent portion (a water-repellent film, water-repellent particles, etc.) formed on the surface to be treated of the fibers (water-repellent fibers) may contain an aerogel. That is, for example, the water-repellent film and the water-repellent particles formed on the surface to be treated may respectively be a film containing an aerogel or particles containing an aerogel.

Figure 3:
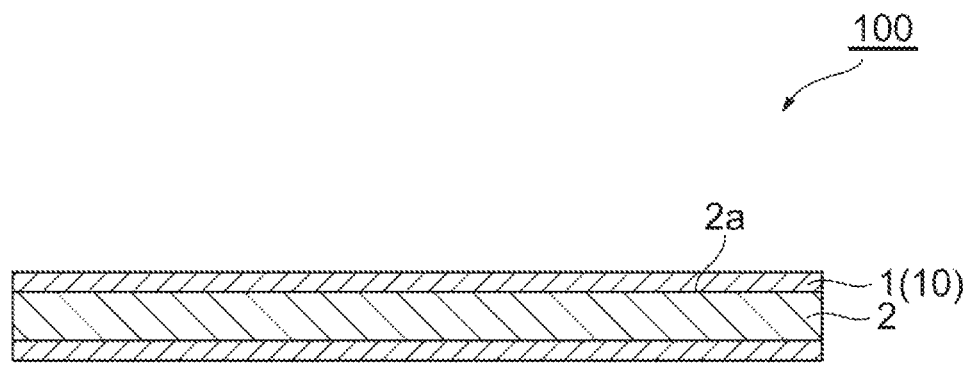
FIG. 3 is a diagram schematically illustrating a fiber (water-repellent fiber) according to an embodiment of the present invention.

FIG. 3 is a diagram schematically illustrating a fiber (water-repellent fiber) according to an embodiment of the present invention. A water-repellent fiber 100 illustrated in FIG. 3 has a structure in which a water-repellent portion 10 consisting of a water-repellent film 1 is formed on a surface 2a to be treated of the fiber 2. Here, the water-repellent portion 10 includes a dried product of the treatment agent of the present embodiment. It is considered that through the inclusion of the water-repellent portion 10 consisting of the water-repellent film 1 on the surface 2a to be treated, the water-repellent fiber 100 is imparted with water repellency, which is a chemical property of the water-repellent film. Further, since the water-repellent portion 10 includes the dried product of the treatment agent of the present embodiment, it is considered that the water-repellent fiber 100 is also excellent in thermal insulation properties. Here, it can be said that the water-repellent portion in the present aspect is not a monolithic film, but is a film formed by deposition of minute water-repellent particles (water-repellent component).

Figure 4:
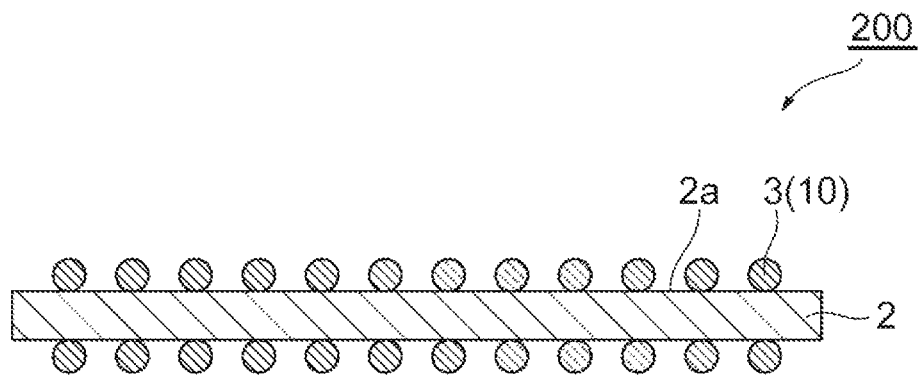
FIG. 4 is a diagram schematically illustrating a fiber (water-repellent fiber) according to an embodiment of the present invention.

FIG. 4 is a diagram schematically illustrating a fiber (water-repellent fiber) according to an embodiment of the present invention. A water-repellent fiber 200 illustrated in FIG. 4 has a structure in which the water-repellent portion 10 consisting of water-repellent particles 3 is formed on the surface 2a to be treated of the fiber 2. Here, the water-repellent portion 10 includes a dried product of the treatment agent of the present embodiment. It is considered that through the inclusion of the water-repellent portion 10 consisting of the water-repellent particles 3 on the surface 2a to be treated, a Lotus effect, which is a physical property of the water-repellent particles, is obtained due to fine uneven shapes, whereby the water-repellent fiber 200 is imparted with high water repellency. Further, since the water-repellent portion 10 includes the treatment agent of the present embodiment or a reaction product of the treatment agent, it is considered that the water-repellent fiber 200 is also excellent in thermal insulation properties. Here, it can be said that the water-repellent portion in the present aspect is formed by water-repellent particles (water-repellent component) that have grown to a certain size adhering to the surface to be treated.

Figure 5:
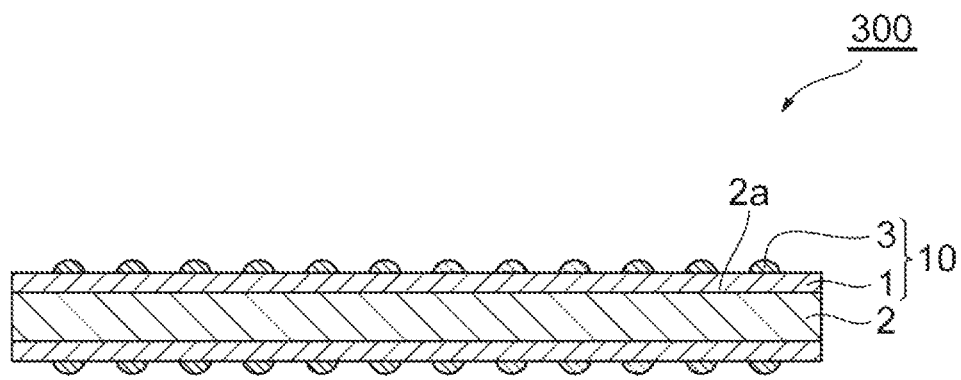
FIG. 5 is a diagram schematically illustrating a fiber (water-repellent fiber) according to an embodiment of the present invention.

FIG. 5 is a diagram schematically illustrating a fiber (water-repellent fiber) according to an embodiment of the present invention. A water-repellent fiber 300 illustrated in FIG. 5 has a structure in which the water-repellent portion 10 including the water-repellent film 1 and water-repellent particles 3 are formed on the surface 2a to be treated of the fiber 2. Here, the water-repellent portion 10 includes a dried product of the treatment agent of the present embodiment. It is considered that through the inclusion of the water-repellent portion 10 including the water-repellent film 1 and the water-repellent particles 3 on the surface 2a to be treated, the water-repellent fiber 300 is imparted with water repellency, which is a chemical property of the water-repellent particles, and a Lotus effect, which is a physical property of the water-repellent particles, is obtained due to fine uneven shapes, whereby the water-repellent fiber 300 is imparted with even better water repellency. Further, since the water-repellent portion 10 includes the dried product of the treatment agent of the present embodiment, it is considered that the water-repellent fiber 300 is also excellent in thermal insulation properties.

As especially above, a water-repellent portion having various aspects can be obtained depending on the size of the particles formed from the treatment agent. Specifically, when the water-repellent particles are minute, a water-repellent portion is formed in an aspect with a film-like appearance in which the particles have been deposited to a predetermined thickness, and when the water-repellent particles are large to a certain extent, a water-repellent portion is formed in an aspect with a particulate appearance in which the particles are individually arranged in a plane. When minute and large water-repellent particles are both present, a water-repellent portion is formed in an aspect with a composite appearance.

In addition, for the surface-treated fibers illustrated in FIGS. 3 to 5, although the surface to be treated 2a of the fiber 2 has been treated with the treatment agent, these figures are not intended to exclude an aspect where an inner portion of the fiber 2 is treated with the treatment agent. More specifically, a dried product of the treatment agent may be included in an inner portion of the fiber 2 (or may be a part of the inner portion of the fiber 2).

In the water-repellent fibers and the water-repellent fiber sheet of the present embodiment, the thickness of the water-repellent film may be, for example, 1 to 500 nm, or 20 to 200 nm. By setting the thickness to 1 nm or more, even better water repellency can be achieved, and by setting the thickness to 500 nm or less, even better adhesiveness can be achieved.

In the water-repellent fibers and the water-repellent fiber sheet of the present embodiment, the size of the water-repellent particles may be, for example, 0.1 to 10000 nm, or 1 to 1000 nm. By setting the size of the water-repellent particles to 0.1 nm or more, even better water repellency can be achieved, and by setting the size to 10000 nm or less, even better adhesiveness can be achieved.

In view of the above, in the water-repellent fibers and the water-repellent fiber sheet of the present embodiment, the thickness of the water-repellent portion may be, for example, 1 to 10000 nm, or 20 to 1000 nm.

In the water-repellent fibers and the water-repellent fiber sheet of the present embodiment, an apparent surface area of the fiber in the portion where the water-repellent portion is formed may be, from the viewpoint of further improving water repellency, based on the apparent surface area of an untreated fiber, 20% or more, or 50% or more. The apparent surface area refers to, for example, the surface area of the fiber calculated by observation using a scanning electron microscope (SEM).

<Production Method of Water-Repellent Fibers>

Next, the production method of the water-repellent fibers will be described. The production method of the water-repellent fibers of the present embodiment treats the fibers using the treatment agent of the present embodiment. According to such a production method, fibers excellent in water repellency and thermal insulation properties can be produced. Hereinafter, specific examples of the production method of the treatment agent and the method for treating the fibers will be described.

[Production Method of Treatment Agent]

The production method of the treatment agent is not particularly limited, but the treatment agent can be produced, for example, by the following method.

The treatment agent of the present embodiment can be produced, for example, by a production method mainly comprising a blending step and a condensation reaction step.

Hereinafter, each step of the method for producing the treatment agent of the present embodiment will be described.

(Blending Step)

The blending step is a step of mixing the above-mentioned polysiloxane compound and, optionally, silica particles, silane monomer, solvent, and the like. As a result of this step, a hydrolysis reaction of a silicon compound such as a polysiloxane compound can be performed. The silica particles may be mixed in a dispersion dispersed in a solvent. In this step, an acid catalyst may be further added to the solvent to accelerate the hydrolysis reaction. Further, a surfactant can also be added to the solvent. When using a silicon compound having a condensable functional group, the hydrolysis reaction is not necessarily essential.

Examples of the solvent that can be used include water or a mixed solution of water and alcohols. Examples of the alcohols include methanol, ethanol, n-propanol, 2-propanol, n-butanol, 2-butanol, and t-butanol. From the viewpoint of reducing the interfacial tension with the surface to be treated of the fibers, the alcohols may have, for example, a low surface tension and a low boiling point. Examples of alcohols in which the surface tension is low and the boiling point is low include methanol, ethanol, and 2-propanol. These may be used singly or in a mixture of two or more.

Examples of the acid catalysts include: inorganic acids such as hydrofluoric acid, hydrochloric acid, nitric acid, sulfuric acid, sulfurous acid, phosphoric acid, phosphorous acid, hypophosphorous acid, bromic acid, chloric acid, chlorous acid, and hypochlorous acid; acid phosphates such as acid aluminum phosphate, acid magnesium phosphate, and acid zinc phosphate; and organic carboxylic acids such as acetic acid, formic acid, propionic acid, oxalic acid, malonic acid, succinic acid, citric acid, malic acid, adipic acid, and azelaic acid. Among these, in consideration of environmental pollution, examples of the acid catalysts capable of accelerating the hydrolysis reaction include organic carboxylic acids. Examples of the organic carboxylic acids include an acetic acid, but formic acid, propionic acid, oxalic acid, malonic acid, or the like can also be used. These may be used singly or in a mixture of two or more.

Use of the acid catalyst accelerates the hydrolysis reaction of the polysiloxane compound and the silane monomer, and thus, allows the hydrolyzed solution to be obtained in a shorter time.

The added amount of the acid catalyst can be, for example, 0.001 to 600.0 parts by mass per 100 parts by mass of the total amount of the polysiloxane compound group and the silane monomer group.

As the surfactant, a non-ionic surfactant, an ionic surfactant, and the like can be used. These may be used singly or in a mixture of two or more.

Examples of the non-ionic surfactant that can be used include compounds containing a hydrophilic portion such as polyoxyethylene and a hydrophobic portion principally consisting of an alkyl group and compounds containing a hydrophilic portion such as polyoxypropylene. Examples of the compounds containing a hydrophilic portion such as polyoxyethylene and a hydrophobic portion principally consisting of an alkyl group include polyoxyethylenenonyl phenyl ether, polyoxyethyleneoctyl phenyl ether, and polyoxyethylene alkyl ether. Examples of compounds containing a hydrophilic portion such as polyoxypropylene include polyoxypropylenealkyl ether and a block copolymer of polyoxyethylene with polyoxypropylene.

Examples of the ionic surfactant include a cationic surfactant, an anionic surfactant, and an amphoteric surfactant. Examples of the cationic surfactant include bromocetyltrimethyl ammonium, and chlorocetyltrimethyl ammonium; Examples of the anionic surfactant include sodium dodecyl sulfonate. Further, examples of the amphoteric surfactant include an amino acid type surfactant, a betaine type surfactant, and an amine oxide type surfactant. Examples of the amino acid type surfactant include acylglutamic acid. Examples of the betaine type surfactant include lauryldimethylaminoacetic acid betaine and stearyldimethylaminoacetic acid betaine. Examples of the amine oxide type surfactant include lauryldimethylamine oxide.

These surfactants are considered to have an action of improving the dispersibility of the polysiloxane compound in the solvent, and on occasion the dispersibility of the silica particles, silane monomer, and the like, in the solvent in the blending step. Further, these surfactants are considered to have an action of reducing differences in chemical compatibility between the solvent in the reaction system and the growing siloxane polymer in the condensation reaction step to be described later, thereby improving dispersibility.

The added amount of the surfactant depends on the kind of the surfactant or on the kinds and amounts of the polysiloxane compound and the silane monomer; however, the added amount thereof may be, for example, per 100 parts by mass of the total amount of the polysiloxane compound group and the silane monomer group, 1 to 100 parts by mass, or 5 to 60 parts by mass.

The hydrolysis in the blending step depends on the kinds and amounts of the polysiloxane compound, the silane monomer, the silica particles, the acid catalyst, the surfactant, and the like in the mixed solution; however, the hydrolysis may, for example, be conducted for 10 minutes to 24 hours under a temperature environment of 20 to 60° C., or for 5 minutes to 8 hours under a temperature environment of 50 to 60° C. By conducting the hydrolysis in this manner, the hydrolyzable functional groups in the polysiloxane compound and the silane monomer are sufficiently hydrolyzed, and the hydrolyzate of the polysiloxane compound and the hydrolyzate of the silane monomer can be obtained more reliably.

In the blending step, a treatment agent can be obtained that includes a liquid composition containing at least one selected from the group consisting of a polysiloxane compound having a hydrolyzable functional group or a condensable functional group, and a hydrolyzate of the polysiloxane compound having a hydrolyzable functional group.

(Condensation Reaction Step)

In the condensation reaction step, it is possible to perform a condensation reaction of the polysiloxane compound having a condensable functional group, the silane monomer, the hydrolysis reaction product obtained in the blending step, and the like. In this step, a base catalyst can be used to accelerate the condensation reaction. Moreover, in this step, a thermally hydrolyzable compound which generates a base catalyst by thermal hydrolysis can also be added.

Examples of the base catalyst include: alkaline metal hydroxides such as lithium hydroxide, sodium hydroxide, potassium hydroxide, and cesium hydroxide; ammonium compounds such as ammonium hydroxide, ammonium fluoride, ammonium chloride, and ammonium bromide; basic sodium phosphate salts such as sodium metaphosphate, sodium pyrophosphate, and sodium polyphosphate; carbonate salts such as calcium carbonate, potassium carbonate, sodium carbonate, barium carbonate, magnesium carbonate, lithium carbonate, ammonium carbonate, copper(II) carbonate, iron(II) carbonate, and silver(I) carbonate; bicarbonate salts such as calcium bicarbonate, potassium bicarbonate, sodium bicarbonate, and ammonium bicarbonate; aliphatic amines such as allylamine, diallylamine, triallylamine, isopropylamine, diisopropylamine, ethylamine, diethylamine, triethylamine, 2-ethylhexylamine, 3-ethoxypropylamine, diisobutylamine, 3-(diethylamino)propylamine, di-2-ethylhexylamine, 3-(dibutylamino)propylamine, tetramethylethylenediamine, t-butylamine, sec-butylamine, propylamine, 3-(methylamino)propylamine, 3-(dimethylamino)propylamine, 3-methoxyamine, dimethylethanolamine, methyldiethanolamine, diethanolamine, and triethanolamine; and nitrogen-containing heterocyclic compounds such as morpholine, N-methylmorpholine, 2-methylmorpholine, piperazine and a derivative thereof, piperizine and a derivative thereof, and imidazole and a derivative thereof. Among these, from the viewpoint of handling safety and odor, carbonate salts or bicarbonate salts s are preferable, and from the viewpoint of economic efficiency, sodium carbonate or sodium bicarbonate is more preferable. The above-described base catalysts may be used singly or in a mixture of two or more.

By using a base catalyst, a dehydration condensation reaction, a dealcoholization condensation reaction, or both reactions of the polysiloxane compound group, the silane monomer group, and the silica particles in the hydrolyzed solution can be accelerated, and the treatment agent can be obtained in a shorter time.

The added amount of the base catalyst may be, for example, per 100 parts by mass of the total amount of the polysiloxane compound group and the silane monomer group, 0.1 to 500 parts by mass, or 1.0 to 200 parts by mass. By setting the added amount of the base catalyst to 0.1 parts by mass or more, the condensation reaction can be performed in a shorter time, and by setting the added amount to 500 parts by mass or less, layer separation is suppressed more easily.

The thermally hydrolyzable compound is considered to generate a base catalyst by thermal hydrolysis, causing the reaction solution to become basic, thereby accelerating the condensation reaction.

Therefore, the thermally hydrolyzable compound is not particularly limited as long as it is a compound which can make the reaction solution basic after thermal hydrolysis; examples thereof include: urea; acid amides such as formamide, N-methylformamide, N,N-dimethylformamide, acetamide, N-methylacetamide, and N,N-dimethylacetamide; cyclic nitrogen compounds such as hexamethylenetetramine Among these, it is particularly easy for urea to obtain the above-mentioned acceleration effect.

The added amount of the thermally hydrolyzable compound is not particularly limited as long as it is an amount capable of sufficiently accelerating the condensation reaction. For example, when urea is used as the thermally hydrolyzable compound, the added amount thereof may be, per 100 parts by mass of the total amount of the polysiloxane compound group and the silane monomer group, 1 to 200 parts by mass, or 2 to 150 parts by mass. By setting the added amount to 1 part by mass or more, good reactivity can be obtained more easily, and by setting the added amount to 200 parts by mass or less, layer separation is suppressed more easily.

The reaction in the condensation reaction step may be conducted in a sealed vessel so that the solvent and the base catalyst do not volatilize. The reaction temperature may be, for example, 20 to 90° C., or 40 to 80° C. By setting the reaction temperature to 20° C. or more, the condensation reaction can be performed in a shorter time. Further, by setting the reaction temperature to 90° C. or less, volatilization of the solvent (particularly alcohols) is more easily suppressed, and as a result the condensation reaction can be performed while suppressing layer separation.

The condensation reaction time depends on the kind of the polysiloxane compound group, the silane monomer group, and the like, and the reaction temperature, but may be, for example, 2 to 480 hours, or 6 to 120 hours. By setting the reaction time to 2 hours or more, even better water repellency and adhesiveness can be achieved, and by setting the reaction time to 480 hours or less, layer separation is suppressed more easily.

In addition, when silica particles are included in the hydrolyzed solution, the condensation reaction time can be further shortened. The reason for this is presumed to be that the silanol group, the reactive group, or both of those groups having the polysiloxane compound group and the silane monomer group in the hydrolyzed solution form a hydrogen bond, a chemical bond, or a combination of such bonds with the silanol group of the silica particles. In this case, the condensation reaction time may be, for example, 10 minutes to 24 hours, or 30 minutes to 12 hours. By setting the reaction time to 10 minutes or more, even better water repellency and adhesiveness can be achieved, and by setting the reaction time to 24 hours or less, layer separation is suppressed more easily.

As a result of the condensation reaction step, a treatment agent can be obtained that comprises a condensation product of a liquid composition comprising at least one selected from the group consisting of a polysiloxane compound having a hydrolyzable functional group or a condensable functional group and a hydrolyzate of the polysiloxane compound having a hydrolyzable functional group. In addition, as a result of this step, a treatment agent comprising the above-mentioned water-repellent component can be obtained.

The size of the water-repellent particles can be adjusted by changing, for example, the condensation reaction time, the size of the silica particles, the size of the aerogel particles, and the like. This enables fibers of a desired aspect to be obtained.

[Method for Treating Fibers]

The method for treating the fibers is not particularly limited, and examples thereof include methods mainly including a coating step, a washing step, and a drying step (pre-drying step and aging step).

Hereinafter, each of these steps will be described.

(Coating Step)

The coating step is a step of coating the surface to be treated of the fibers (surface of the fibers) with the above-mentioned treatment agent. In some cases, after coating the surface to be treated may be dried to volatilize the solvent. For example, by performing this step, a water-repellent portion (a water-repellent film and/or water-repellent particles) can be formed on the surface to be treated. The entire surface to be treated may be coated or a part of the surface to be treated may be selectively coated with the treatment agent.

The coating method is not particularly limited, and examples thereof include spin coating, dip coating, spray coating, flow coating, bar coating, and gravure coating. In particular, a dip coating method is preferable because it has high productivity and can easily treat the surface of fibers having irregularities. These methods may be used singly or in combination of two or more.

The surface to be treated of the fibers may be coated with the treatment agent by coating or impregnating another film, cloth, or the like with the treatment agent in advance, and then contacting that coated or impregnated piece with the surface to be treated. The coating method can be freely selected according to the amount of treatment agent used, the area and the properties of the surface to be treated, and the like.

The temperature of the treatment agent used in the coating step may be, for example, 20 to 80° C., or 40 to 60° C. By setting the temperature to 20° C. or more, water repellency and adhesiveness tend to be even better, and by setting the temperature to 80° C. or less, the transparency of the water-repellent portion tends to be obtained more easily. The treatment time by the treatment agent can be, for example, 0.5 to 4 hours.

The fibers to be treated are not particularly limited, and examples thereof include synthetic fibers produced by melt spinning, non-woven fabrics produced by a spunbond method, a melt blowing method, a flash spinning method and the like; natural fibers, and inorganic fibers.

Examples of the material constituting the synthetic fibers or non-woven fabric include resins, such as a thermoplastic resin.

Specific examples of synthetic fibers and non-woven fabric include polyolefin fibers, polyester fibers, and polyamide fibers. The material constituting the synthetic fibers and non-woven fabric may be a single kind or two or more kinds. That is, the synthetic fibers and the non-woven fabric may be a composite fiber in which two or more different resins are combined.

Examples of the composite fiber include fibers obtained by combining two or more resins having different melting points. Examples of the combination of resins in such composite fiber include copolymerized polyester/polyester, copolymerized polypropylene/polypropylene, polypropylene/polyamide, polyethylene/polypropylene, polypropylene/polyester, and polyethylene/polyester.

The composite fiber may be, for example, a core-sheath-type composite fiber in which different materials are used in the core part and the sheath part. In the core-sheath-type composite fiber, for example, the core part may be formed of a high melting point resin and the sheath part may be formed of a low melting point resin. The resin that constitutes the core part may be, for example, a resin that does not have a melting point and has a decomposition temperature. In the core-sheath-type composite fiber, the core part may be made of, for example, an inorganic fiber.

The core-sheath-type composite fiber may be, for example, an aspect in which the surface of the fiber, such as a rayon fiber, an acetate fiber, a wool fiber, and an inorganic fiber, is coated with a thermoplastic resin. Examples of the coating method of the thermoplastic resin onto the fiber surface include an immersion method and a coating method.

Examples of the inorganic fiber constituting the core part of core-sheath-type composite fiber include a carbon fiber, a glass fiber, a ceramic fiber, and a metal fiber. From the viewpoint of having a high melting point, the inorganic fiber may be, for example, a glass fiber, a ceramic fiber, or a metal fiber.

Examples of the natural fiber include cellulose fiber, cotton, hemp, wool, and silk. Examples of the inorganic fiber include glass fiber, silica fiber, alumina fiber, ceramic fiber, metal fiber (e.g., steel fiber and stainless steel fiber), and carbon fiber. These fibers can be used singly or in combination of two or more.

From the viewpoint of strength and durability, for example, the fiber may be glass fiber, carbon fiber, polyester fiber, and polyamide fiber; and from the viewpoint of economic efficiency, for example, the fiber may be glass fiber and polyester fiber.

The cross-sectional shape and the surface shape of the fiber are not particularly limited, and can be any shape; the fiber diameter (average diameter) and the fiber length are not particularly limited. The fiber diameter may be, for example, 0.1 μm to 3 mm, or 0.5 μm to 500 μm. By setting the fiber diameter to 0.1 μm or more, an appropriate mechanical strength can be easily obtained, and by setting the fiber diameter to 3 mm or less, the thermal insulation properties tend to be even better. As used herein, the term fiber diameter refers to the diameter of a circle of the same area as the cross-sectional area of the fiber.

The adhesiveness of the water-repellent portion can be further improved by, after coating with the treatment agent, drying the obtained fibers to volatilize the solvent. The drying temperature in this case is not particularly limited, and depends on the heat resistance temperature of surface to be treated; however, the drying temperature may be, for example, 60 to 250° C., or 120 to 180° C. By setting this temperature to 60° C. or more, even better adhesiveness can be achieved, and by setting the temperature to 250° C. or less, degradation due to heat can be suppressed.

(Washing Step)

The washing step is a step of washing the fibers obtained in the coating step. By performing this step, impurities such as unreacted substances and by-products in the water-repellent portion can be reduced, thereby enabling a higher purity water-repellent portion to be obtained.

The washing step can be, for example, carried out repeatedly using water and/or an organic solvent. At that time, the washing efficiency can be improved by warming.

Examples of the organic solvents that can be used include a variety of organic solvents, such as methanol, ethanol, 1-propanol, 2-propanol, 1-butanol, acetone, methyl ethyl ketone, 1,2-dimethoxyethane, acetonitrile, hexane, toluene, diethyl ether, chloroform, ethyl acetate, tetrahydrofuran, methylenechloride, N,N-dimethylformamide, dimethyl sulfoxide, acetic acid, and formic acid. These organic solvents may be used singly or in a mixture of two or more.

Organic solvents generally have extremely low mutual solubility with water. Therefore, when washing by using an organic solvent after washing with water, an organic solvent having high mutual solubility with water is preferable. Among such organic solvents, examples of the hydrophilic organic solvents include methanol, ethanol, 2-propanol, acetone, methyl ethyl ketone, and 1,2-dimethoxyethane. In addition, methanol, ethanol, methyl ethyl ketone, and the like are preferable in terms of their excellent economic efficiency.

The amount of the water and/or organic solvent used in the washing step may be, for example, an amount that is 3 to 10 times based on the total mass of the water-repellent portion. The washing can be repeated until the water content of the fiber surface is 10% by mass or less.

The washing temperature may be a temperature equal to or less than the boiling point of the solvent used for washing; for example, when methanol is used, the washing temperature may be about 20 to 60° C. The washing efficiency can also be improved by warming The washing time may be, for example, 3 to 30 minutes.

(Drying Step: Pre-Drying Step)

A pre-drying step is a step of pre-drying the fibers washed in the washing step.

The drying technique is not particularly restricted, and a known drying method under atmospheric pressure can be used, for example. The drying temperature depends on the heat resistant temperature of the fiber and the kind of the washing solvent. From the viewpoint of having a sufficiently rapid evaporation rate of the solvent and easily preventing degradation of the water-repellent portion, the drying temperature may be, for example, 20 to 250° C., or 60 to 180° C. The drying time depends on the mass of the water-repellent portion and the drying temperature, but may be, for example, 1 to 24 hours.

(Drying Step: Aging Step)

The aging step is a step of thermally aging the water-repellent portion dried in the pre-drying step. As a result of this step, the final water-repellent fiber can be obtained. By performing the aging step, the water repellency and adhesiveness of the water-repellent fiber are further improved.

This step can be performed as additional drying after the pre-drying step. It is considered that by performing aging, hydrophilic groups in the water-repellent portion are reduced and water repellency is further improved. In addition, when transparency deteriorates due to the water-repellent portion causing volume shrinkage in the pre-drying step, the transparency may be improved by restoring the volume through springing back.

The aging temperature depends on the heat resistant temperature of the fiber, but may be, for example, 100 to 250° C., or 120 to 180° C. By setting the aging temperature to 100° C. or more, even better water repellency and adhesiveness can be achieved, and by setting the aging temperature to 250° C. or less, degradation due to heat can be suppressed.

The aging time depends on the mass of the water-repellent portion and the aging temperature, but may be, for example, 1 to 10 hours, or 2 to 6 hours. By setting the aging time to 1 hour or more, it is easier to achieve even better water repellency and adhesiveness, and by setting the aging time to 10 hours or less, it is less likely that productivity is reduced.

Although an example of the production method of the treatment agent and the water-repellent fiber have been described above, the production method of the treatment agent and the water-repellent fiber is not limited to this.

<Production Method of Water-Repellent Fiber Sheet>

Next, a production method of the water-repellent fiber sheet will be described. Examples of the production method of the water-repellent fiber sheet according to the present embodiment include a method comprising a step of producing the fiber sheet by using the water-repellent fibers obtained by the production method described above. Specifically, the water-repellent fiber sheet can be produced by, for example, a method of producing water-repellent fibers and then processing the water-repellent fibers into a sheet shape with a papermaking machine, a weaving machine, a knitting machine or the like. That is, the fiber sheet (water-repellent fiber sheet) of the present embodiment may comprise the fibers (water-repellent fibers) of the present embodiment. According to such a production method, a fiber sheet can be produced excellent in water repellency and thermal insulation properties.

The production method of the water-repellent fiber sheet may be a method in which the fiber sheet is treated by using the treatment agent of the present embodiment (the fiber sheet is impregnated with the treatment agent). According to such a production method, a fiber sheet can be produced excellent in water repellency and thermal insulation properties. Examples of the production method of such a water-repellent fiber sheet are not particularly limited, but include a method in which a fiber sheet is used in place of the fibers in the above-mentioned production method of the water-repellent fibers.

Examples of the fiber sheet used in the treatment include sheet-like fibers, such as a textile fabric, a knitted fabric, and a non-woven fabric sheet. Examples of textile and knitted fabrics include fibers processed by a weaving machine or knitting machine. The non-woven fabric sheet may be, for example, a fiber sheet obtained by a dry method, a spunbond method, a melt blowing method, a flash spinning method, and a wet method.

Further, the fiber sheet may, for example, be formed by heat-treating a sheet produced from composite fibers obtained by compositing adhesive fibers and two or more resins having different melting points, and the like with the above-mentioned sheet-like fibers (fiber web etc.) to bond the fibers together.

The fiber sheet may be, for example, a sheet in which a plurality of sheet-like fibers (e.g., a fiber web) have been entangled by a mechanical entanglement process such as hydroentanglement or needle punching, or may be a sheet in which such fibers have been bonded together by a heated roll. For example, a partially bonded fiber sheet may be obtained by using a smooth roll and a roll having irregularities.

The fiber sheet may also be formed by, for example, laminating a plurality of different fiber sheets and integrating them.

Examples of the production method of the water-repellent fiber sheet of the present embodiment have been described above, but the production method of the water-repellent fiber sheet is not limited to this.

EXAMPLES

The present invention will now be described in more detail by the following Examples, which should not be construed as limiting the present invention.

Example 1

[Treatment Agent 1]

Mixed together were 40.0 parts by mass of carbinol modified siloxane "XF42-05277" (product name, manufactured by Momentive) as a polysiloxane compound, and 6.4 parts by mass of cetyltrimethylammonium bromide (manufactured by Wako Pure Chemical Industries, Ltd.: hereafter abbreviated as "CTAB") as a cationic surfactant, and 51.6 parts by mass of a 100 mM aqueous acetic acid solution, and the mixture was stirred at 25° C. for 2 hours. To this was added 2.0 parts by mass of sodium carbonate as a base catalyst, and the resultant was stirred at 60° C. for 2 hours to obtain treatment agent 1.

[Water-Repellent Fibers 1]

Glass fibers FS19W-N (product name, manufactured by Nippon Muki Co., Ltd.) having a fiber diameter of 3.5 μm were dipped in the above treatment agent 1, and treated at 60° C. for 2 hours. Then, the treated glass fibers were dipped in methanol and washed at 25° C. for 5 minutes. Then, the resultant was dipped in methyl ethyl ketone and washed at 25° C. for 5 minutes. The washed glass fibers were dried at 120° C. for 1 hour under normal pressure, and then aged at 150° C. for 6 hours to obtain water-repellent fibers 1.

[Water-Repellent Fiber Sheet 1]

A 1 L mixer TM837 (product name, TESCOM) was charged with 3 g of the above water-repellent fibers 1, 750 g of purified water, and 0.01 g of a surfactant Laccol AL (product name, Meisei Chemical Works, Ltd.), and the mixture was stirred for 30 seconds. Then, the stirred mixture was transferred to a 5 L beaker, 3250 g of purified water and 0.04 g of the above surfactant were further added, and stirring was carried out at a rotational speed of 1000 rpm until aggregation of the water-repellent fibers 1 could no longer be visually confirmed to obtain a dispersion of water-repellent fibers 1. The obtained dispersion of water-repellent fibers 1 was charged into a standard sheet machine papermaking apparatus (product name, Kumagaya Riki Kogyo Co., Ltd.) equipped with a 150 mesh; the charged dispersion was then diluted with purified water to a total volume of 10 L, and then water-filtration and drying were carried out to produce a water-repellent fiber sheet 1 having a basis weight of 120 g/m², consisting of water-repellent fibers 1, and having a thickness of 0.50 mm.

Example 2

[Treatment Agent 2]

Mixed together were 20.0 parts by mass of a polysiloxane compound A as a polysiloxane compound, 3.2 parts by mass of CTAB as a cationic surfactant, and 75.8 parts by mass of 100 mM aqueous acetic acid solution, and the mixture was stirred at 25° C. for 2 hours. To this was added 1.0 part by mass of sodium carbonate as a base catalyst, and the resultant was stirred at 60° C. for 2 hours to obtain a treatment agent 2.

The "polysiloxane compound A" was synthesized as follows. First, in a 1-liter three-necked flask equipped with a stirrer, a thermometer, and a Dimroth condenser, 100.0 parts by mass of hydroxy-terminated dimethylpolysiloxane "XC96-723" (product name, manufactured by Momentive), 181.3 parts by mass of methyltrimethoxysilane, and 0.50 parts by mass of t-butylamine were mixed and reacted at 30° C. for 5 hours. Then, the reaction solution was heated at 140° C. for 2 hours under a reduced pressure of 1.3 kPa to remove volatile components, to thereby obtain a biterminally bifunctional alkoxy-modified polysiloxane compound (polysiloxane compound A).

[Water-Repellent Fibers 2]

Water-repellent fibers 2 were obtained in the same manner as in Example 1, except that treatment agent 1 was changed to treatment agent 2 and the glass fibers were changed to glass fibers FM600 having a fiber diameter of 1.0 μm (product name, Nippon Muki Co., Ltd.).

[Water-Repellent Fiber Sheet 2]

A water-repellent fiber sheet 2 having a basis weight of 120 g/m$^2$, consisting of the water-repellent fibers 2, and having a thickness of 0.50 mm was produced in the same manner as in Example 1, except that water-repellent fibers 1 were changed to water-repellent fibers 2.

Example 3

[Treatment Agent 3]

Mixed together were 20.0 parts by mass of XF42-05277 as a polysiloxane compound, 3.2 parts by mass of CTAB as a cationic surfactant, and 75.0 parts by mass of a PL-2L solution adjusted to an acetic acid concentration of 100 mM as a raw material containing silica particles (details on PL-2L are described in Table 1, and the raw material containing silica particles is the same below), and the mixture was stirred at 25° C. for 2 hours. To this was added 2.0 parts by mass of sodium carbonate as a base catalyst, and the resultant was stirred at 60° C. for 2 hours to obtain a treatment agent 3.

[Water-Repellent Fibers 3]

Water-repellent fibers 3 were obtained in the same manner as in Example 2, except that treatment agent 2 was changed to treatment agent 3.

[Water-Repellent Fiber Sheet 3]

A water-repellent fiber sheet 3 having a basis weight of 120 g/m$^2$, consisting of the water-repellent fibers 3, and having a thickness of 0.50 mm was produced in the same manner as in Example 2, except that water-repellent fibers 2 were changed to water-repellent fibers 3.

Example 4

[Treatment Agent 4]

Mixed together were 20.0 parts by mass of a polysiloxane compound B as a polysiloxane compound, 3.2 parts by mass of CTAB as a cationic surfactant, and 49.8 parts by mass of 100 mM aqueous acetic acid solution, and 25.0 parts by mass of the PL-2L solution adjusted to an acetic acid concentration of 100 mM as a raw material containing silica particles, and the mixture was stirred at 25° C. for 2 hours. To this was added 2.0 parts by mass of sodium carbonate as a base catalyst, and the resultant was stirred at 60° C. for 2 hours to obtain a treatment agent 4.

The "polysiloxane compound B" was synthesized as follows. First, in a 1-liter three-necked flask equipped with a stirrer, a thermometer, and a Dimroth condenser, 100.0 parts by mass of XC96-723, 202.6 parts by mass of tetramethoxysilane, and 0.50 parts by mass of t-butylamine were mixed and reacted at 30° C. for 5 hours. Then, the reaction solution was heated at 140° C. for 2 hours under a reduced pressure of 1.3 kPa to remove volatile components, to thereby obtain a biterminally trifunctional alkoxy-modified polysiloxane compound (polysiloxane compound B).

[Water-Repellent Fibers 4]

Water-repellent fibers 4 were obtained in the same manner as in Example 2, except that treatment agent 2 was changed to treatment agent 4.

[Water-Repellent Fiber Sheet 4]

A water-repellent fiber sheet 4 having a basis weight of 120 g/m$^2$, consisting of the water-repellent fibers 4, and having a thickness of 0.50 mm was produced in the same manner as in Example 2, except that water-repellent fibers 2 were changed to water-repellent fibers 4.

Example 5

[Treatment agent 5]

Mixed together were 10.0 parts by mass of the polysiloxane compound A as a polysiloxane compound, 15.0 parts by mass of methyltrimethoxysilane KBM-13 (product name, manufactured by Shin-Etsu Chemical Co., Ltd.; hereinafter abbreviated as "MTMS") as a silane monomer, 4.0 parts by mass of CTAB as a cationic surfactant, and 69.8 parts by mass of 100 mM aqueous acetic acid solution, and the mixture was stirred at 25° C. for 2 hours. To this was added 1.2 parts by mass of sodium carbonate as a base catalyst, and the resultant was stirred at 60° C. for 2 hours to obtain a treatment agent 5.

[Water-Repellent Fibers 5]

Water-repellent fibers 5 were obtained in the same manner as in Example 1, except that treatment agent 1 was changed to treatment agent 5.

[Water-Repellent Fiber Sheet 5]

A water-repellent fiber sheet 5 having a basis weight of 120 g/m$^2$, consisting of the water-repellent fibers 5, and having a thickness of 0.50 mm was produced in the same manner as in Example 1, except that water-repellent fibers 1 were changed to water-repellent fibers 5.

Example 6

[Treatment Agent 6]

Mixed together were 10.0 parts by mass of the polysiloxane compound A as a polysiloxane compound, 15.0 parts by mass of MTMS as a silane monomer, 4.0 parts by mass of CTAB as a cationic surfactant, and 43.5 parts by mass of 100 mM aqueous acetic acid solution, and 25.0 parts by mass of the PL-2L solution adjusted to an acetic acid concentration of 100 mM as a raw material containing silica particles, and the mixture was stirred at 25° C. for 2 hours. To this was added 2.5 parts by mass of sodium carbonate as a base catalyst, and the resultant was stirred at 60° C. for 2 hours to obtain a treatment agent 6.

[Water-Repellent Fibers 6]

Water-repellent fibers 6 were obtained in the same manner as in Example 2, except that treatment agent 2 was changed to treatment agent 6.

[Water-Repellent Fiber Sheet 6]

A water-repellent fiber sheet 6 having a basis weight of 120 g/m², consisting of the water-repellent fibers 6, and having a thickness of 0.50 mm was produced in the same manner as in Example 2, except that water-repellent fibers 2 were changed to water-repellent fibers 6.

Example 7

[Treatment Agent 7]

Mixed together were 1.0 part by mass of the polysiloxane compound A as a polysiloxane compound, 3.0 parts by mass of MTMS, 1.0 part by mass of dimethyldimethoxysilane KBM-22 (product name, manufactured by Shin-Etsu Chemical Co., Ltd.; hereinafter abbreviated as "DMDMS") as a silane monomer, 0.8 parts by mass of CTAB as a cationic surfactant, and 88.7 parts by mass of 100 mM aqueous acetic acid solution, and 5.0 parts by mass of the PL-2L solution adjusted to an acetic acid concentration of 100 mM as a raw material containing silica particles, and the mixture was stirred at 25° C. for 2 hours. To this was added 0.5 parts by mass of sodium carbonate as a base catalyst, and the resultant was stirred at 60° C. for 2 hours to obtain a treatment agent 7.

[Water-Repellent Fibers 7]

Water-repellent fibers 7 were obtained in the same manner as in Example 2, except that treatment agent 2 was changed to treatment agent 7.

[Water-Repellent Fiber Sheet 7]

A water-repellent fiber sheet 7 having a basis weight of 120 g/m², consisting of the water-repellent fibers 7, and having a thickness of 0.50 mm was produced in the same manner as in Example 2, except that water-repellent fibers 2 were changed to water-repellent fibers 7.

Example 8

[Water-Repellent Fibers 8]

Glass fibers FS600 (product name, Nippon Muki Co., Ltd.) having a fiber diameter of 1.0 μm were dipped at 25° C. for 5 minutes in the above-mentioned treatment agent 7, the glass fibers were then dried at 150° C. for 2 hours, and the solvent was volatilized. The dried glass fibers were dipped in methanol and washed at 25° C. for 5 minutes. Then, the glass fibers were dipped in methyl ethyl ketone and washed at 25° C. for 5 minutes. The washed glass fibers were dried at 120° C. for 1 hour under normal pressure, and then aged at 150° C. for 6 hours to obtain water-repellent fibers 8.

[Water-Repellent fiber Sheet 8]

A water-repellent fiber sheet 8 having a basis weight of 120 g/m², consisting of the water-repellent fibers 8, and having a thickness of 0.50 mm was produced in the same manner as in Example 2, except that water-repellent fibers 2 were changed to water-repellent fibers 8.

Example 9

[Fiber Sheet]

A 1 L mixer TM837 (product name, manufactured by TESCOM) was charged with 3 g of glass fibers FM600 (product name, Nippon Muki Co., Ltd.) having a fiber diameter of 1.0 μm, 750 g of purified water, and 0.01 g of a surfactant Laccol AL (product name, Meisei Chemical Works, Ltd.), and the mixture was stirred for 30 seconds; then, the resultant was transferred to a 5 L beaker, 3250 g of purified water and 0.04 g of the above surfactant were further added, and stirring was carried out at a rotational speed of 1000 rpm until aggregation of the fibers could no longer be visually confirmed to obtain a dispersion of fibers. The obtained dispersion of fibers was charged into a standard sheet machine papermaking apparatus (product name, Kumagaya Riki Kogyo Co., Ltd.) equipped with a 150 mesh; the charged dispersion was then diluted with purified water to a total volume of 10 L, and then water-filtration and drying were carried out to produce a fiber sheet having a basis weight of 120 g/m², consisting of fibers, and having a thickness of 0.50 mm.

[Water-Repellent Fiber Sheet 9]

The above-mentioned fiber sheet was dipped in the above-mentioned treatment agent 7, and treated at 60° C. for 2 hours. Then, the treated fiber sheet was dipped in methanol and washed at 25° C. for 5 minutes. Then, the resultant was dipped in methyl ethyl ketone and washed at 25° C. for 5 minutes. The washed fiber sheet was dried at 120° C. for 1 hour under normal pressure, and then aged at 150° C. for 6 hours to obtain a water-repellent fiber sheet 9.

Example 10

[Treatment Agent 8]

Mixed together were 10.0 parts by mass of the polysiloxane compound A as a polysiloxane compound, 15.0 parts by mass of MTMS as a silane monomer, 4.0 parts by mass of CTAB as a cationic surfactant, 69.8 parts by mass of 100 mM aqueous acetic acid solution, and 1.2 parts by mass of sodium carbonate as a base catalyst, and the mixture was stirred at 25° C. for 6 hours to obtain a treatment agent 8.

[Water-Repellent Fibers 9]

Water-repellent fibers 9 were obtained in the same manner as in Example 1, except that treatment agent 1 was changed to treatment agent 8.

[Water-Repellent Fiber Sheet 10]

A water-repellent fiber sheet 10 having a basis weight of 120 g/m², consisting of the water-repellent fibers 9, and having a thickness of 0.50 mm was produced in the same manner as in Example 1, except that water-repellent fibers 1 were changed to water-repellent fibers 9.

Example 11

[Treatment Agent 9]

Mixed together were 1.0 part by mass of the polysiloxane compound A as a polysiloxane compound, 3.0 parts by mass of MTMS and 1.0 part by mass of DMDMS as a silane monomer, 0.8 parts by mass of CTAB as a cationic surfactant, and 88.7 parts by mass of 100 mM aqueous acetic acid solution, 5.0 parts by mass of the PL-2L solution adjusted to an acetic acid concentration of 100 mM as a raw material containing silica particles, and 0.5 parts by mass of sodium carbonate as a base catalyst, and the mixture was stirred at 25° C. for 6 hours to obtain a treatment agent 9.

[Water-Repellent Fibers 10]

Water-repellent fibers 10 were obtained in the same manner as in Example 2, except that treatment agent 2 was changed to treatment agent 9.

[Water-Repellent Fiber Sheet 11]

A water-repellent fiber sheet 11 having a basis weight of 120 g/m², consisting of the water-repellent fibers 10, and having a thickness of 0.50 mm was produced in the same manner as in Example 2, except that water-repellent fibers 2 were changed to water-repellent fibers 10.

Example 12

[Treatment agent 10]

Mixed together were 10.0 parts by mass of the polysiloxane compound A as a polysiloxane compound, 15.0 parts by mass of MTMS as a silane monomer, 4.0 parts by mass of CTAB as a cationic surfactant, 69.8 parts by mass of 100 mM aqueous acetic acid solution, and 1.0 part by mass of IC3100 (product name, manufactured by Cabot) as aerogel particles, and the mixture was stirred at 25° C. for 2 hours. To this was added 2.0 parts by mass of sodium carbonate as a base catalyst, and the resultant was stirred at 60° C. for 2 hours to obtain a treatment agent 10.

[Water-Repellent Fibers 11]

Water-repellent fibers 11 were obtained in the same manner as in Example 1, except that treatment agent 1 was changed to treatment agent 10.

[Water-Repellent Fiber Sheet 12]

A water-repellent fiber sheet 12 having a basis weight of 120 g/m$^2$, consisting of the water-repellent fibers 11, and having a thickness of 0.50 mm was produced in the same manner as in Example 1, except that water-repellent fibers 1 were changed to water-repellent fibers 11.

Example 13

[Treatment Agent 11]

Mixed together were 1.0 part by mass of the polysiloxane compound A as a polysiloxane compound, 3.0 parts by mass of MTMS and 1.0 part by mass of DMDMS as a silane monomer, 0.8 parts by mass of CTAB as a cationic surfactant, 88.7 parts by mass of 100 mM aqueous acetic acid solution, 5.0 parts by mass of the PL-2L solution adjusted to an acetic acid concentration of 100 mM as a raw material containing silica particles, 1.0 part by mass of IC3100 as aerogel particles, and 0.5 parts by mass of sodium carbonate as a base catalyst, and the mixture was stirred at 25° C. for 6 hours to obtain a treatment agent 11.

[Water-Repellent Fibers 12]

Water-repellent fibers 12 were obtained in the same manner as in Example 2, except that treatment agent 2 was changed to treatment agent 11.

[Water-Repellent Fiber Sheet 13]0

A water-repellent fiber sheet 13 having a basis weight of 120 g/m$^2$, consisting of the water-repellent fibers 12, and having a thickness of 0.50 mm was produced in the same manner as in Example 2, except that water-repellent fibers 2 were changed to water-repellent fibers 12.

Comparative Example 1

[Comparative Treatment Agent 1]

Mixed together were 30.0 parts by mass of MTMS as a silane monomer, 2.4 parts by mass of CTAB as a cationic surfactant, and 66.1 parts by mass of 100 mM aqueous acetic acid solution, and the mixture was stirred at 25° C. for 2 hours. To this was added 1.5 parts by mass of sodium carbonate as a base catalyst, and the resultant was stirred at 60° C. for 2 hours to obtain comparative treatment agent 1.

[Comparative Water-Repellent Fibers 1]

Comparative water-repellent fibers 1 were obtained in the same manner as in Example 1, except that treatment agent 1 was changed to comparative treatment agent 1.

[Comparative Water-Repellent Fiber Sheet 1]

A comparative water-repellent fiber sheet 1 was obtained in the same manner as in Example 1, except that water-repellent fibers 1 were changed to comparative water-repellent fibers 1.

Comparative Example 2

[Comparative Treatment Agent 2]

Mixed together were 20.0 parts by mass of MTMS as a silane monomer, 15.0 parts by mass of DMDMS, 2.8 parts by mass of CTAB as a cationic surfactant, and 60.5 parts by mass of 100 mM aqueous acetic acid solution, and the mixture was stirred at 25° C. for 2 hours. To this was added 1.7 parts by mass of sodium carbonate as a base catalyst, and the resultant was stirred at 60° C. for 2 hours to obtain comparative treatment agent 2.

[Comparative Water-Repellent Fibers 2]

Comparative water-repellent fibers 2 were obtained in the same manner as in Example 2, except that treatment agent 2 was changed to comparative treatment agent 2.

[Comparative Water-Repellent Fiber Sheet 2]

A comparative water-repellent fiber sheet 2 was obtained in the same manner as in Example 2, except that water-repellent fibers 2 were changed to comparative water-repellent fibers 2.

Comparative Example 3

[Comparative Treatment Agent 3]

Mixed together were 30.0 parts by mass of fluoroalkylsilane XC98-B2472 (product name, manufactured by Momentive) as a silane monomer, 2.4 parts by mass of CTAB as a cationic surfactant, and 66.1 parts by mass of 100 mM aqueous acetic acid solution, and the mixture was stirred at 25° C. for 2 hours. To this was added 1.5 parts by mass of sodium carbonate as a base catalyst, and the resultant was stirred at 60° C. for 2 hours to obtain comparative treatment agent 3.

[Comparative Water-Repellent Fibers 3]

Comparative water-repellent fibers 3 were obtained in the same manner as in Example 2, except that treatment agent 2 was changed to comparative treatment agent 3.

[Comparative Water-Repellent Fiber Sheet 3]

A comparative water-repellent fiber sheet 3 was obtained in the same manner as in Example 2, except that water-repellent fibers 2 were changed to comparative water-repellent fibers 3.

Comparative Example 4

[Comparative Water-Repellent Fiber Sheet 4]

A comparative water-repellent fiber sheet 4 was obtained in the same manner as in Example 9, except that treatment agent 7 was changed to comparative treatment agent 2.

The aspects (kind and content of polysiloxane compound, kind and content of silane monomer, and kind and content of raw material containing silica particles) of the treatment agent in each Example and Comparative Example are collectively shown in Table 1. Further, the aspects (kind and treatment method of the treatment agent, and the kind of treatment target) of the water-repellent fiber sheet in each Example and Comparative Example are also collectively shown in Table 2.

TABLE 1

| | | Si Raw Material | | Raw Material Containing Silica Particles | | | | | Aerogel | |
| --- | --- | --- | --- | --- | --- | --- | --- | --- | --- | --- |
| | | | | Silica Particles | | | | | | |
| | | Kind | Content (parts by mass) | Kind | Number of Silanol Groups (groups/g) | Kind | Shape | Average Primary Particle Size (nm) | Solid Fraction (% by mass) | Particles Content (% by mass) | Solid Content (% by mass) |
| Treatment Agent | 1 | XF42-C5277 | 40.0 | — | — | — | — | — | — | — | — |
| | 2 | Polysiloxane Compound A | 20.0 | — | — | — | — | — | — | — | — |
| | 3 | XF42-C5277 | 20.0 | PL-2L | $550 \times 10^{18}$ | Colloidal Silica | Spherical | 20 | 20 | — | 15.0 |
| | 4 | Polysiloxane Compound B | 20.0 | PL-2L | $550 \times 10^{18}$ | Colloidal Silica | Spherical | 20 | 20 | — | 5.0 |
| | 5 | Polysiloxane Compound A<br>MTMS | 10.0<br>15.0 | — | — | — | — | — | — | — | — |
| | 6 | Polysiloxane Compound A<br>MTMS | 10.0<br>15.0 | PL-5L | $190 \times 10^{18}$ | Colloidal Silica | Cocoon | 50 | 20 | — | 5.0 |
| | 7 | Polysiloxane Compound A<br>MTMS<br>DMDMS | 1.0<br>3.0<br>1.0 | PL-2L | $550 \times 10^{18}$ | Colloidal Silica | Spherical | 20 | 20 | — | 1.0 |
| | 8 | Polysiloxane Compound A<br>MTMS | 10.0<br>15.0 | — | — | — | — | — | — | — | — |
| | 9 | Polysiloxane Compound A<br>MTMS<br>DMDMS | 1.0<br>3.0<br>1.0 | PL-2L | $550 \times 10^{18}$ | Colloidal Silica | Spherical | 20 | 20 | — | 1.0 |
| | 10 | Polysiloxane Compound A<br>MTMS | 10.0<br>15.0 | — | — | — | — | — | — | 1.0 | 1.0 |
| | 11 | Polysiloxane Compound A<br>MTMS<br>DMDMS | 1.0<br>3.0<br>1.0 | PL-2L | $550 \times 10^{18}$ | Colloidal Silica | Spherical | 20 | 20 | 1.0 | 2.0 |
| Comparative Treatment Agent | 1 | MTMS | 30.0 | — | — | — | — | — | — | — | — |
| | 2 | MTMS<br>DMDMS | 20.0<br>15.0 | — | — | — | — | — | — | — | — |
| | 3 | X98-B2472 | 30.0 | — | — | — | — | — | — | — | — |

TABLE 2

| | Water-Repellent Treatment Agent | | Treatment | |
| --- | --- | --- | --- | --- |
| | Kind | Treatment Method | Target Kind | |
| Example 1 | Water-Repellent Treatment Agent 1 | Dip Coating | Glass Fibers FS19W-N | |
| Example 2 | Water-Repellent Treatment Agent 2 | Dip Coating | Glass Fibers FM600 | |
| Example 3 | Water-Repellent Treatment Agent 3 | Dip Coating | Glass Fibers FM600 | |
| Example 4 | Water-Repellent Treatment Agent 4 | Dip Coating | Glass Fibers FM600 | |
| Example 5 | Water-Repellent Treatment Agent 5 | Dip Coating | Glass Fibers FS19W-N | |
| Example 6 | Water-Repellent Treatment Agent 6 | Dip Coating | Glass Fibers FM600 | |
| Example 7 | Water-Repellent Treatment Agent 7 | Dip Coating | Glass Fibers FM600 | |
| Example 8 | Water-Repellent Treatment Agent 7 | Dip Coating + Drying | Glass Fibers FM600 | |
| Example 9 | Water-Repellent Treatment Agent 7 | Dip Coating | Fiber Sheet | |
| Example 10 | Water-Repellent Treatment Agent 8 | Dip Coating | Glass Fibers FS19W-N | |
| Example 11 | Water-Repellent Treatment Agent 9 | Dip Coating | Glass Fibers FM600 | |
| Example 12 | Water-Repellent Treatment Agent 10 | Dip Coating | Glass Fibers FS19W-N | |
| Example 13 | Water-Repellent Treatment Agent 11 | Dip Coating | Glass Fibers FM600 | |
| Comparative Example 1 | Comparative Water-Repellent Treatment Agent 1 | Dip Coating | Glass Fibers FS19W-N | |
| Comparative Example 2 | Comparative Water-Repellent Treatment Agent 2 | Dip Coating | Glass Fibers FM600 | |
| Comparative Example 3 | Comparative Water-Repellent Treatment Agent 3 | Dip Coating | Glass Fibers FM600 | |
| Comparative Example 4 | Comparative Water-Repellent Treatment Agent 2 | Dip Coating | Fiber Sheet | |

[Evaluations]

The water-repellent fiber sheet obtained in each Example and an untreated fiber sheet were measured or evaluated according to the following conditions. The evaluation results of water contact angle measurement, thermal conductivity measurement, and measurement of the signal area ratio relating to the silicon-containing bonding units Q, T, and D are collectively shown in Table 3.

(1) Water Contact Angle Measurement

The water-repellent fiber sheet obtained in each Example and Comparative Example and an untreated fiber sheet were dried at 105° C. for 1 hour for use as measurement samples. Next, 2 μL of ultrapure water droplets were dropped by using a contact angle meter DMs-401 manufactured by Kyowa Interface Science Co., Ltd., and the contact angle after 5 seconds was measured at room temperature. The measurement was performed five times, and the average value was taken as the water contact angle.

(2) Measurement of Thermal Conductivity

The water-repellent fiber sheet obtained in each Example and Comparative Example and an untreated fiber sheet were cut into 250 mm squares, and dried at 105° C. for 1 hour for use as measurement samples. The measurement of thermal conductivity was carried out by using a steady state thermal conductivity measuring device "HFM436Lambda" (product name: manufactured by NETZSCH). The measurement conditions were an average temperature of 25° C. and under atmospheric pressure. Six of the measurement samples obtained as described above were stacked and sandwiched between an upper heater and a lower heater at a load of 0.3 MPa to set a temperature differential ΔT of 20° C.; while adjusting such that one-dimensional heat flow was formed by a guard heater, the upper surface temperature, the lower surface temperature and the like of the measurement samples were measured. A thermal resistance $R_S$ of the measurement samples was then determined according to the following equation.

$$R_S = N(T_U - T_L)/Q - R_O$$

In the equation, $T_U$ represents the upper surface temperature of the measurement sample, $T_L$ represents the lower surface temperature of the measurement sample, $R_O$ represents a contact thermal resistance at the interface between the upper and lower surfaces, and Q represents a heat flux meter output. Note that N is a proportional coefficient, which was determined in advance by using a calibration sample.

A thermal conductivity λ of the measurement samples was determined from the obtained thermal resistance $R_s$ according to the following equation.

$$\lambda = d/R_s$$

In the equation, d represents a thickness of the measurement sample.

(3) Measurement of Signal Area Ratio Relating to Silicon-Containing Bonding Units Q, T, and D Measurement was carried out by using a "FT-NMR AV400WB" (product name, manufactured by Brucker Biospin KK) as a solid $^{29}$Si-NMR device. The measurement conditions were, measuring mode: DD/MAS method; probe: CPMAS probe with 4 mm φ; magnetic field: 9.4 T; resonance frequency: 79 Hz; MAS rotation speed: 4 kHZ; and delay time: 150 seconds. Sodium 3-trimethylsilylpropionate was used as the standard sample.

The water-repellent fiber sheet obtained in each Example and Comparative Example was finely cut to prepare the measurement sample, which was then packed in a rotor made of $ZrO_2$ and mounted on a probe to carry out the measurement. Also, in the spectrum analysis, the line broadening coefficient was set at 2 Hz, and the obtained signal area ratio relating to the silicon-containing bonding units Q, T, and D, (Q+T:D), was determined.

TABLE 3

| | Water Contact Angle (degrees) | Thermal Conductivity (mW/m²) | Q + T:D Area Ratio |
|---|---|---|---|
| Fiber Sheet | 0 (Water Permeation) | 43 | — |
| Example 1 | 152 | 33 | 0:1 |
| Example 2 | 152 | 32 | 1:5.0 |
| Example 3 | 152 | 32 | 1:0.70 |
| Example 4 | 151 | 32 | 1:0.80 |
| Example 5 | 152 | 31 | 1:0.30 |
| Example 6 | 153 | 30 | 1:0.39 |
| Example 7 | 155 | 30 | 1:0.42 |
| Example 8 | 154 | 30 | 1:0.42 |
| Example 9 | 154 | 30 | 1:0.42 |
| Example 10 | 142 | 33 | 1:0.27 |
| Example 11 | 143 | 32 | 1:0.39 |
| Example 12 | 150 | 31 | 1:0.25 |
| Example 13 | 152 | 30 | 1:0.36 |
| Comparative Example 1 | 100 | 34 | 1:0 |
| Comparative Example 2 | 110 | 46 | 1:0.75 |
| Comparative Example 3 | 112 | 44 | 1:0 |
| Comparative Example 4 | 108 | 46 | 1:0.75 |

It can be seen from Table 3 that all of the water-repellent fiber sheets of the Examples have a water contact angle of 150 degrees or more, and are superior in water repellency to the untreated fiber sheet and the Comparative Examples. In addition, it can be seen that the water-repellent fiber sheet of the examples has lower thermal conductivity and better thermal insulation properties than the untreated fiber sheet and the Comparative Examples.

From the above results, it is understood that the treatment agent of the present invention can impart excellent water repellency and thermal insulation properties to fibers.

REFERENCE SIGNS LIST

L: Circumscribed rectangle, P: silica particle, 1: water-repellent film, 2: fiber, 2a: surface to be treated, 3: water-repellent particles, 10: water-repellent portion, 100, 200, 300: water-repellent fiber.

The invention claimed is:

1. A dried water-repellent fiber, comprising:
a fiber; and
a water-repellent portion on a surface to be treated of the fiber,
the water-repellent portion comprising a compound having a structure represented by the following formula (3):

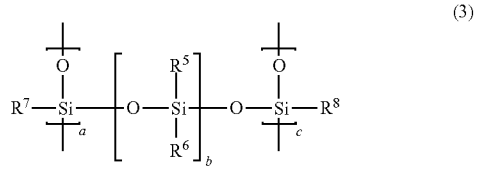

wherein $R^5$, $R^6$, $R^7$, $R^8$ each independently represent an alkyl group or an aryl group, a and c each independently represent an integer of 6 to 3000, and b represents an integer of 1 to 50, wherein the water-repellent portion does not comprise an aerogel.

2. A water-repellent fiber sheet comprising the dried water-repellent fiber according to claim 1.

3. The dried water-repellent fiber according to claim 1, wherein, in following formula (3), a and c each independently represent an integer of 6 to 2000.

4. The dried water-repellent fiber according to claim 1, wherein, in following formula (3), a and c each independently represent an integer of 10 to 1000.

* * * * *